United States Patent
Hasegawa et al.

(10) Patent No.: US 10,948,778 B2
(45) Date of Patent: Mar. 16, 2021

(54) LIQUID CRYSTAL DISPLAY PANEL AND LIQUID CRYSTAL DISPLAY DEVICE

(71) Applicant: SHARP KABUSHIKI KAISHA, Sakai (JP)

(72) Inventors: Masahiro Hasegawa, Sakai (JP); Koji Murata, Sakai (JP); Yuichi Kawahira, Sakai (JP); Takako Koide, Sakai (JP); Kozo Nakamura, Sakai (JP); Akira Sakai, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 121 days.

(21) Appl. No.: 16/321,330

(22) PCT Filed: Jul. 28, 2017

(86) PCT No.: PCT/JP2017/027408
§ 371 (c)(1),
(2) Date: Jan. 28, 2019

(87) PCT Pub. No.: WO2018/021521
PCT Pub. Date: Feb. 1, 2018

(65) Prior Publication Data
US 2019/0171052 A1  Jun. 6, 2019

(30) Foreign Application Priority Data
Jul. 28, 2016 (JP) .............................. JP2016-148598

(51) Int. Cl.
G02F 1/13363 (2006.01)
G02F 1/1335 (2006.01)
(Continued)

(52) U.S. Cl.
CPC ........ *G02F 1/13363* (2013.01); *G02F 1/1337* (2013.01); *G02F 1/13394* (2013.01);
(Continued)

(58) Field of Classification Search
None
See application file for complete search history.

(56) References Cited

U.S. PATENT DOCUMENTS

2004/0156001 A1  8/2004  Moriya
2006/0203160 A1  9/2006  Moriya
(Continued)

FOREIGN PATENT DOCUMENTS

JP  2004-240102 A  8/2004
JP  2004-258623 A  9/2004
(Continued)

OTHER PUBLICATIONS

Translation of JP2008083492 (Year: 2020).*

*Primary Examiner* — Phu Vu
(74) *Attorney, Agent, or Firm* — ScienBiziP, P.C.

(57) ABSTRACT

A liquid crystal display panel of the present invention includes, sequentially from the viewer side: a first linearly polarizing plate; a first λ/4-wavelength layer; a first substrate including a color filter, a black matrix, and a second λ/4-wavelength layer; a liquid crystal layer; a second substrate; and a second linearly polarizing plate, the liquid crystal display panel further including a sealing material disposed so as to surround the liquid crystal layer in a plan view, wherein the second λ/4-wavelength layer is disposed closer to the liquid crystal layer than the color filter and the black matrix are and such that an outer edge of the second λ/4-wavelength layer lies inside an arrangement region of the sealing material, and the first λ/4-wavelength layer and
(Continued)

the second λ/4-wavelength layer are disposed such that their slow axes are perpendicular to each other.

22 Claims, 11 Drawing Sheets

(51) Int. Cl.
    *G02F 1/1337*     (2006.01)
    *G02F 1/1339*     (2006.01)
    *G02F 1/1343*     (2006.01)

(52) U.S. Cl.
    CPC .. *G02F 1/133502* (2013.01); *G02F 1/133528* (2013.01); *G02F 1/133634* (2013.01); *G02F 1/133711* (2013.01); *G02F 1/134363* (2013.01); *G02F 2001/133541* (2013.01); *G02F 2001/133565* (2013.01); *G02F 2001/133633* (2013.01); *G02F 2001/133638* (2013.01); *G02F 2001/133738* (2013.01); *G02F 2001/134372* (2013.01); *G02F 2202/28* (2013.01); *G02F 2413/01* (2013.01); *G02F 2413/02* (2013.01); *G02F 2413/05* (2013.01); *G02F 2413/06* (2013.01); *G02F 2413/08* (2013.01); *G02F 2413/11* (2013.01); *G02F 2413/13* (2013.01); *G02F 2413/14* (2013.01)

(56) References Cited

U.S. PATENT DOCUMENTS

| | | | |
|---|---|---|---|
| 2009/0257011 A1 | 10/2009 | Mizumoto | |
| 2009/0316095 A1* | 12/2009 | Do | G02F 1/1393 349/118 |
| 2010/0014033 A1 | 1/2010 | Kawasaki et al. | |
| 2012/0099053 A1 | 4/2012 | Kamoshida et al. | |
| 2018/0052271 A1* | 2/2018 | Wang | C08F 112/20 |

FOREIGN PATENT DOCUMENTS

| | | |
|---|---|---|
| JP | 2006-215221 A | 8/2006 |
| JP | 2008-083492 A | 4/2008 |
| JP | 2008-217001 A | 9/2008 |
| JP | 2009-276743 A | 11/2009 |
| JP | 2012-078431 A | 4/2012 |
| JP | 2012-093442 A | 5/2012 |
| WO | 2008/102640 A1 | 8/2008 |

* cited by examiner

LIQUID CRYSTAL DISPLAY PANEL AND LIQUID CRYSTAL DISPLAY DEVICE

TECHNICAL FIELD

The present invention relates to liquid crystal display panels and liquid crystal display devices. More specifically, the present invention relates to a liquid crystal display panel including an in-cell retardation layer, and a liquid crystal display device including the liquid crystal display panel.

BACKGROUND ART

Liquid crystal display devices are display devices that use a liquid crystal composition to perform display. Display is typically performed as follows: light is emitted from a backlight unit to a liquid crystal display panel including a liquid crystal composition enclosed between a pair of substrates, and a voltage is applied to the liquid crystal composition to change the alignment of liquid crystal molecules, whereby the amount of light transmitted through the liquid crystal display panel is controlled. Such liquid crystal display devices have advantageous features such as thin profile, lightweight, and low power consumption, and are thus used in electronic devices such as televisions, smartphones, tablet personal computers, and automotive navigation systems.

Liquid crystal display panels sometimes have poor visibility when used outside due to reflection of external light on the inside and surfaces of the liquid crystal display panels. As a technique to improve visibility outside, an in-cell liquid crystal display panel including a retardation layer in the liquid crystal display panel has been studied recently (for example, Patent Literatures 1 and 2).

CITATION LIST

Patent Literature

Patent Literature 1: WO 2008/102640
Patent Literature 2: JP 2012-78431 A

SUMMARY OF INVENTION

Technical Problem

Use of a liquid crystal display panel in a bright environment such as outside sometimes causes poor visibility of a display image due to reflection of external light. Possible causes of poor visibility in a bright environment are, for example, reflection of external light on the surface of a polarizing plate disposed on the viewer-side surface of the liquid crystal display panel, and reflection of external light on an interface between constituent members, such as a black matrix on a color filter substrate, in the liquid crystal display panel.

Patent Literature 1 discloses an in-cell display panel. In order to improve adhesion between a retardation layer and a base material for a liquid crystal display panel in a sealing region, Patent Literature 1 examines curing a polymerizable liquid crystal in an unaligned, isotropic state in a region at least including a region where a retardation layer is to be sealed.

Yet, according to studies by the present inventors, a display defect occurred sometimes in a liquid crystal display panel including a retardation layer in the liquid crystal display panel when it was used in a high-temperature and high-humidity environment. For example, an image of a checkered flag pattern, when displayed, sometimes showed unclear boundaries.

The present invention has been made in view of such a current state of the art and aims to provide a liquid crystal display panel and a liquid crystal display device which provide excellent visibility in dark places and bright places and hardly cause display unevenness even when used in a high-temperature and high-humidity environment.

Solution to Problem

The present inventors focused on that when a first linearly polarizing plate and a first λ/4-wavelength layer were disposed on a substrate surface on the viewer side of a liquid crystal display panel, light incident from the viewer side of the liquid crystal display panel was converted into circularly polarized light, and reflection on the interface between constituent members in the liquid crystal display panel was suppressed. Further, they found that in the case of transmissive display with a light source such as a backlight unit disposed on the backside of the liquid crystal display panel, depending on the alignment mode of the liquid crystal display panel, the transmittance sometimes remained the same even when the alignment azimuth of liquid crystal molecules was changed by application of a voltage to a liquid crystal layer, thus failing to perform monochrome display.

Thus, the present inventors disposed a second λ/4-wavelength layer in the substrate on the viewer side such that its slow axis was perpendicular to a slow axis of the first λ/4-wavelength layer. The present inventors found that, with such an arrangement, retardations of light incident from the backside of the liquid crystal display panel, which were caused by the two λ/4-wavelength layers, were cancelled out by each other, thus achieving optical properties substantially equivalent to those in the case where the two λ/4-wavelength layers were not disposed. Thus, the present inventors found that it is possible to perform transmissive display while suppressing reflection on the interface between constituent members in the liquid crystal display panel.

The present inventors further studied display defects in a high-temperature and high-humidity environment. They found that in the case of an in-cell retardation panel, since a retardation layer is exposed on a lateral side of the liquid crystal display panel, impurities such as moisture enter from an outer edge of the exposed retardation layer into the panel and decrease the voltage holding ratio (VHR), resulting in display defects. They also found that the retardation value changes as the retardation layer itself absorbs external moisture, resulting in display unevenness.

As a countermeasure, the present inventors disposed the second λ/4-wavelength layer such that its outer edge would lie inside an arrangement region of a sealing material so as to prevent exposure of the outer edge of the second λ/4-wavelength layer on the lateral side of the liquid crystal display panel. They found that since the outer edge was not exposed, it was possible to prevent entrance of impurities such as moisture from the outer edge of the second λ/4-wavelength layer. Thereby, the inventors have arrived at the solution to the above problem, completing the present invention.

Specifically, one aspect of the present invention may be a liquid crystal display panel including, sequentially from the viewer side: a first linearly polarizing plate; a first λ/4-wavelength layer; a first substrate including a color filter, a black matrix, and a second λ/4-wavelength layer; a liquid crystal layer; a second substrate; and a second linearly polarizing plate, the liquid crystal display panel further including a sealing material disposed so as to surround the liquid crystal layer in a plan view, wherein the second λ/4-wavelength layer is disposed closer to the liquid crystal layer than the color filter and the black matrix are and such that an outer edge of the second λ/4-wavelength layer lies inside an arrangement region of the sealing material, and the first λ/4-wavelength layer and the second λ/4-wavelength layer are disposed such that their slow axes are perpendicular to each other. Another aspect of the present invention may be a liquid crystal display device including: the liquid crystal display panel of the present invention; and a backlight unit adjacent to the second linearly polarizing plate of the liquid crystal display panel.

Advantageous Effects of Invention

The present invention can provide a liquid crystal display panel and a liquid crystal display device which provide excellent visibility in dark places and bright places and hardly cause display unevenness even when used in a high-temperature and high-humidity environment.

DESCRIPTION OF EMBODIMENTS

Hereinafter, the present invention is described in more detail based on embodiments with reference to the drawings. The embodiments, however, are not intended to limit the scope of the present invention. The configurations of the embodiments may appropriately be combined or modified within the spirit of the present invention.

Herein, that "two axes (azimuths) are perpendicular to each other" means that an angle (absolute value) formed therebetween is in the range of 90±3°, preferably in the range of 90±1°, more preferably in the range of 90±0.5°, particularly preferably 90° (completely perpendicular). The that "two axes (azimuths) are parallel to each other" means that an angle (absolute value) formed therebetween is in the range of 0±3°, preferably in the range of 0±1°, more preferably in the range of 0±0.5°, particularly preferably 0° (completely parallel). That "two axes (azimuths) form an angle of 45° therebetween" means that an angle (absolute value) formed therebetween is in the range of 45±3°, preferably in the range of 45±1°, more preferably in the range of 45±0.5°, particularly preferably 45° (completely 45°).

Embodiment 1

Figure 1:
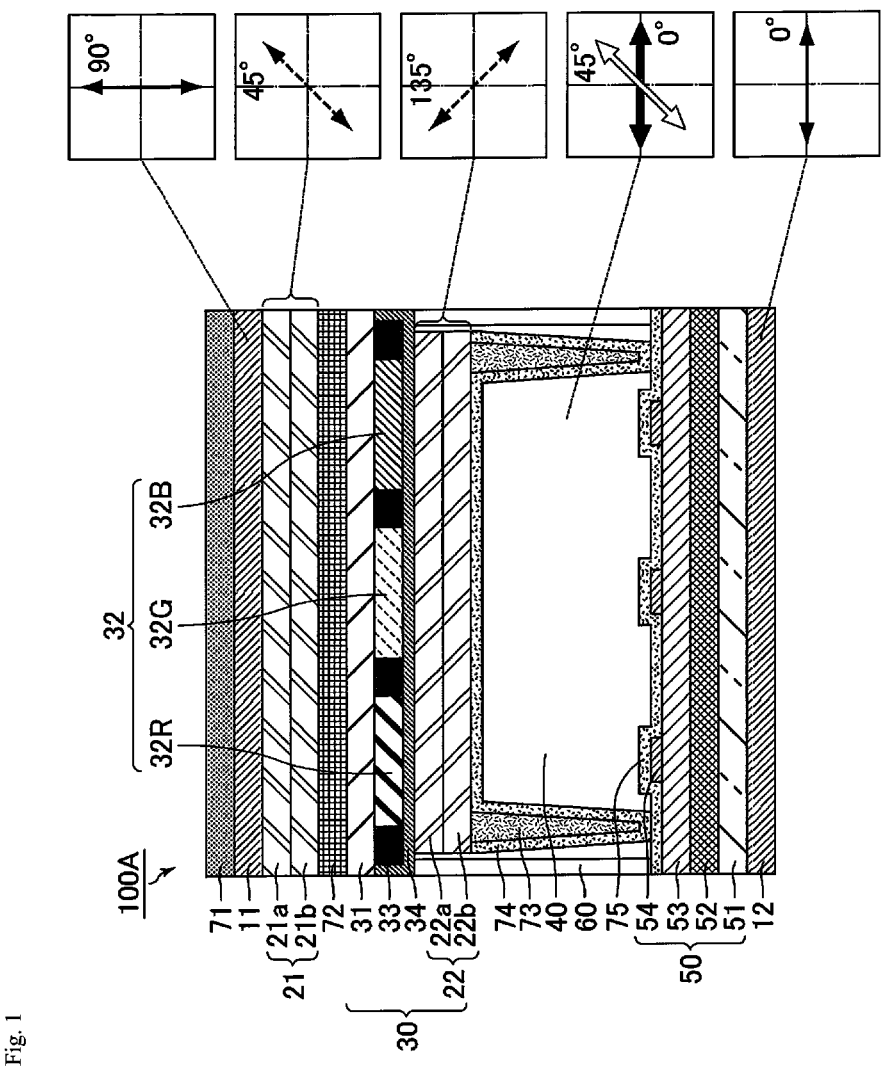
FIG. 1 is a schematic cross-sectional view of a liquid crystal display panel according to Embodiment 1 and Example 1.
Figure 2:
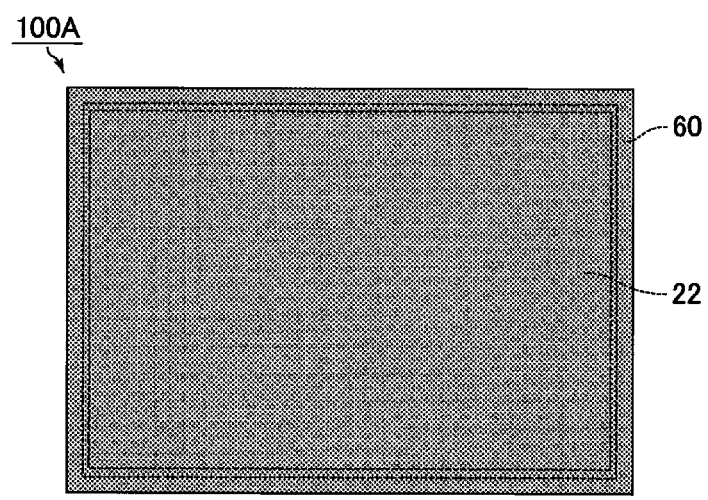
FIG. 2 is a schematic plan view of the liquid crystal display panel according to Embodiment 1 and Example 1.

FIG. 1 is a schematic cross-sectional view of a liquid crystal display panel according to Embodiment 1. FIG. 2 is a schematic plan view of the liquid crystal display panel according to Embodiment 1. FIG. 1 shows an exemplary FFS mode liquid crystal display panel. As shown in FIG. 1, the liquid crystal display panel of Embodiment 1 includes, sequentially from the viewer side: a first linearly polarizing plate 11; a first λ/4-wavelength layer 21; a first substrate 30 including a color filter 32, a black matrix 33, and a second λ/4-wavelength layer 22; a liquid crystal layer 40; a second substrate 50; and a second linearly polarizing plate 12. In addition, as shown in FIG. 2, the liquid crystal display panel also includes a sealing material 60 disposed so as to surround the liquid crystal layer 40 in a plan view. The viewer side is a side to which light is emitted from a light source, and it is a side where images are displayed. The side opposite to the viewer side is also referred to as a backside.

The first linearly polarizing plate 11 and the second linearly polarizing plate 12 are polarizers that extract linearly polarized light from unpolarized light incident on the first linearly polarizing plate 11 and the second linearly polarizing plate 12. The vibration direction of the extracted linearly polarized light is referred to as a "transmission axis". A transmission axis of the first linearly polarizing plate 11 and a transmission axis of the second linearly polarizing plate 12 are preferably perpendicular to each other. Examples of the first linearly polarizing plate 11 and the second linearly polarizing plate 12 include an absorption polarizing plate in which a polarizing film such as a polyvinyl alcohol (PVA) film is sandwiched between triacetyl-cellulose (TAC) films. Examples of the polarizing film include a polyvinyl alcohol (PVA) film stained or adsorbed with an anisotropic material such as an iodine complex (or a dye) and then stretched and aligned.

The first λ/4-wavelength layer 21 is an out-cell retardation layer disposed outside the first substrate 30 (the viewer side). The first λ/4-wavelength layer 21 is a retardation layer that imparts an in-plane retardation of ¼ wavelength to at least light having a wavelength of 550 nm. The first λ/4-wavelength layer 21 may have an in-plane retardation Re1 of 100 nm or more and 176 nm or less as defined by the following formula (1).

$$Re1 = |nx1 - ny1| \times d1 \tag{1}$$

nx1: Refractive index of in-plane slow axis of first λ/4-wavelength layer ny1: Refractive index of in-plane fast axis of first λ/4-wavelength layer d1: Thickness of first λ/4-wavelength layer The first λ/4-wavelength layer 21 may be a positive A plate that satisfies a relationship $nx1 > ny1 = nz1$ or a negative A plate that satisfies a relationship $nx1 < ny1 = nz1$, where nx1 is the refractive index of the in-plane slow axis, ny1 is the refractive index of the in-plane fast axis, and nz1 is the principal refractive index in the thickness direction.

The transmission axis of the first linearly polarizing plate 11 and the slow axis of the first λ/4-wavelength layer may form an angle of 40° to 50° therebetween. By disposing the first linearly polarizing plate 11 and the first λ/4-wavelength layer as described above, it is possible to convert light incident from the viewer side of a liquid crystal display panel 100A into circularly polarized light and suppress reflection of external light. More preferably, the transmission axis of the first linearly polarizing plate 11 and the slow axis of the first λ/4-wavelength layer form an angle of 45° therebetween.

Examples of the first λ/4-wavelength layer 21 include a stack of an alignment layer 21a and a liquid crystalline polymer 21b; sliced plates of inorganic materials such as calcite, mica, or crystal; and stretched films containing a birefringent polymer material. In particular, the stack of the alignment layer 21a and the liquid crystalline polymer 21b is preferred.

The alignment layer 21a is a layer that controls the alignment of the liquid crystalline polymer 21b to be stacked thereon. A liquid crystalline monomer is stacked on the alignment layer 21a, and polymerized to be fixed in a predetermined alignment azimuth, whereby a retardation layer having desired retardation can be formed. The alignment layer 21a may be formed of the same alignment materials as those used for alignment films 74 and 75 (described later). Preferably, the alignment layer 21a has been subjected to alignment treatment. Examples of the alignment treatment method include rubbing and photo-alignment.

The liquid crystalline monomer is a polymerizable monomer having refractive index anisotropy. Examples of the liquid crystalline monomer include a uniaxial liquid crystal (e.g., nematic liquid crystal) and a disk-like discotic liquid crystal, and one whose alignment state can be easily fixed is preferably used. The liquid crystalline monomer may have retardation properties by itself, or may exhibit retardation properties when polymerized on the alignment layer 21a that has been subjected to the alignment treatment. The liquid crystalline monomer is polymerized into the liquid crystalline polymer 21b by, for example, irradiation with polarized ultraviolet light.

Examples of the liquid crystalline monomer include compounds (nematic liquid crystals) represented by the following chemical formulas (1-1) to (1-14).

[Chem. 1]

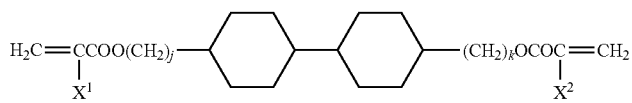

(1-1)

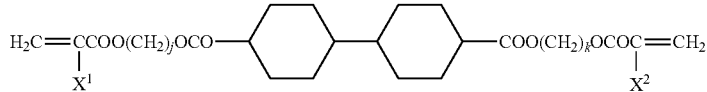

(1-2)

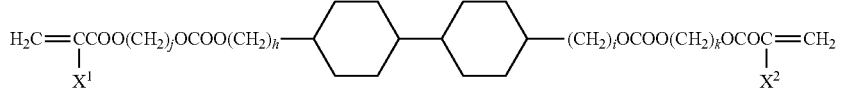

(1-3)

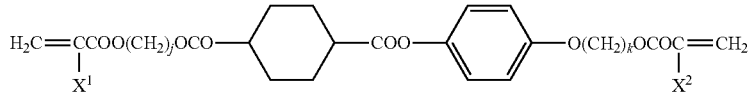

(1-4)

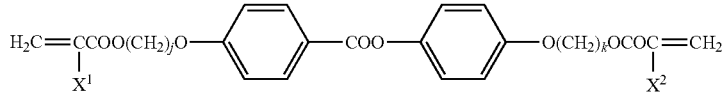

(1-5)

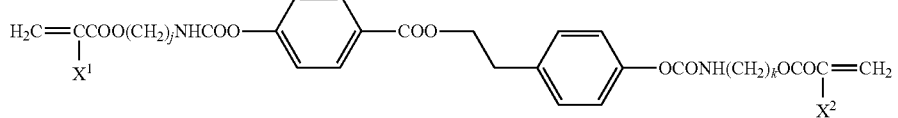

(1-6)

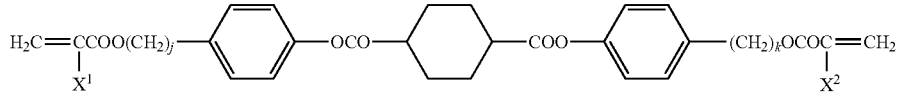

(1-7)

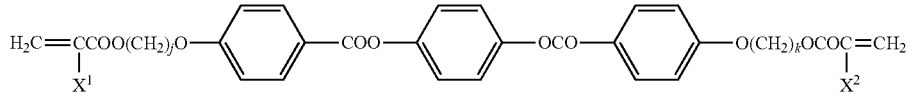

(1-8)

-continued

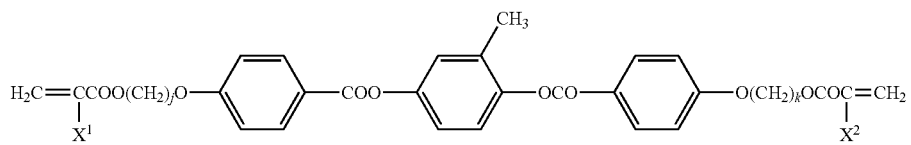
(1-9)

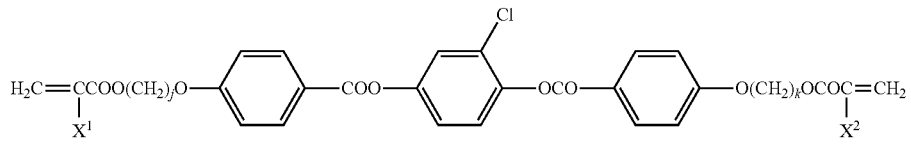
(1-10)

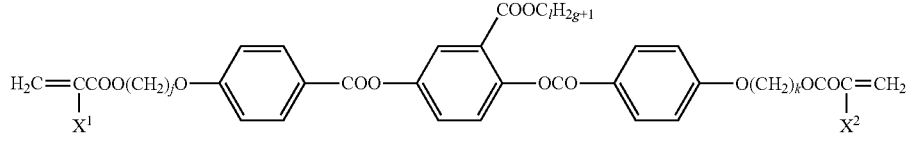
(1-11)

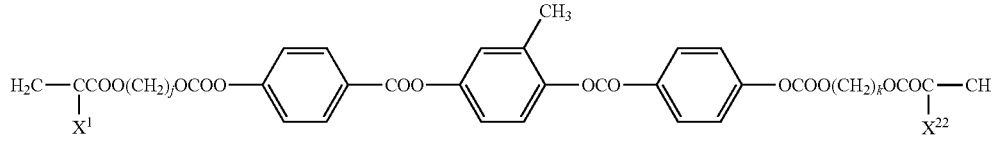
(1-12)

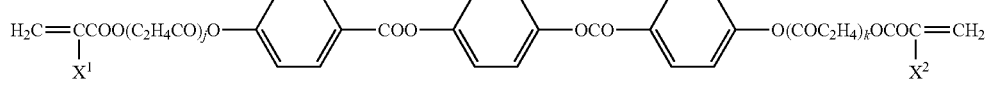
(1-13)

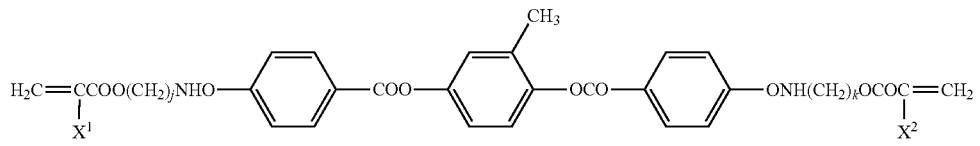
(1-14)

wherein $X^1$ and $X^2$ are the same as or different from each other and each represent a hydrogen atom or a methyl group; g is an integer of 1 to 18; h and i are the same as or different from each other and are integers of 1 to 18; and j and k are the same as or different from each other and are integers of 1 to 12.

In the case where the first λ/4-wavelength layer 21 is a positive A plate, preferably, the alignment layer 21a is an alignment layer that exhibits horizontal alignment properties, and the liquid crystalline monomer for the liquid crystalline polymer 21b is a monomer that exhibits horizontal alignment properties (e.g., nematic liquid crystal). In the case where the first λ/4-wavelength layer 21 is a negative A plate, preferably, the alignment layer 21a is an alignment layer that exhibits vertical alignment properties, and the liquid crystalline monomer for the liquid crystalline polymer 21b is a discotic liquid crystal. The negative A plate can be produced by, for example, the method disclosed in JP 2001-56411 A.

Preferably, the first λ/4-wavelength layer 21 has a thickness of 1.0 μm or more and 3.0 μm or less. A more preferred lower limit of the thickness is 1.2 μm, and a more preferred upper limit thereof is 2.0 μm.

The first substrate 30 is a color filter (CF) substrate. For example, the first substrate 30 has a configuration including a transparent substrate 31, the color filter 32 and the black matrix 33 on the transparent substrate 31, and the second λ/4-wavelength layer 22. Examples of the transparent substrate 31 include glass substrates and plastic substrates.

The color filter 32 and the black matrix 33 are not particularly limited, and those commonly used in the liquid crystal display panel field can be used. For the color filter 32, either a pigment-based or dye-based coloring material can be used. A pigment-based color resist is preferably used. Color combination is not particularly limited. For example, the color filter 32 may include a red the color filter 32R, a green the color filter 32G, and a blue the color filter 32B. The color filter 32 may further include a yellow color filter. For the black matrix 33, a pigment-based black resist is preferably used.

The first substrate 30 may include a first dielectric layer 34 on the color filter 32 and the black matrix 33, on the side facing the liquid crystal layer 40. The presence of the first dielectric layer 34 makes it possible to flatten steps between the color filter 32 and the black matrix 33, for example. The presence of the first dielectric layer 34 allows the second λ/4-wavelength layer 22 (described later) to be formed flat and can also improve adhesion of the second λ/4-wavelength layer 22.

The first dielectric layer 34 may be either an inorganic film or an organic film. Examples of the inorganic film include those containing silicon oxide ($SiO_2$), silicon nitride (SiNx), or the like. In particular, $SiO_2$ and SiNx are preferred because they are highly transparent and highly compact. Examples of the organic film include those containing a photocurable resin or a thermosetting resin.

The first dielectric layer 34 may have a relative permittivity ε of $1.0<\varepsilon<9.0$. A more preferred lower limit of the relative permittivity is 3.0, and a more preferred upper limit thereof is 7.5. It should be noted that the relative permittivity is 1.00059 for air, 3.5 for SiO2, 7.0 for SiNx, and 9.0 for ITO.

Preferably, the first dielectric layer 34 has a thickness of 50 nm to 1000 nm. A more preferred lower limit of the thickness is 80 nm, and a more preferred upper limit thereof is 500 nm. A still more preferred lower limit thereof is 100 nm, and a still more preferred upper limit thereof is 300 nm. The first dielectric layer 34 can be formed by a method such as sputtering, vapor-deposition, or plasma chemical vapor deposition (plasma CVD).

The second λ/4-wavelength layer 22 is an in-cell retardation layer disposed inwardly of the first substrate 30, and it is disposed closer to the liquid crystal layer 40 than the color filter 32 and the black matrix 33 are. The first λ/4-wavelength layer 21 and the second λ/4-wavelength layer 22 are disposed such that their slow axes are perpendicular to each other. With the slow axes of the two retardation layers being perpendicular to each other, retardations of light incident from the backside of the liquid crystal display panel 100A, which were caused by the two λ/4-wavelength layers, are cancelled out by each other, thus achieving optical properties substantially equivalent to those in the case where the two λ/4-wavelength layers are not disposed. The first λ/4-wavelength layer 21 is disposed near the first substrate 30 that includes the second λ/4-wavelength layer 22, and the liquid crystal layer 40 is not disposed between these λ/4-wavelength layers. This arrangement makes it possible for the liquid crystal display panel 100A to perform transmissive display even when its display mode is a transverse electric field mode in which liquid crystal molecules are aligned in an in-plane direction of the liquid crystal display panel both in a voltage applied state and a non-voltage applied state of the liquid crystal layer 40. Specifically, the light incident from the backside of the liquid crystal display panel 100A is transmitted through the second linearly polarizing plate 12, converted into linearly polarized light, and incident on the liquid crystal layer 40. As described above, optically, the two retardation layers can be regarded as not being disposed. Thus, the linearly polarized light can be directly emitted to the viewer side, achieving transmissive display.

The second λ/4-wavelength layer 22 is disposed such that an outer edge of the second λ/4-wavelength layer 22 lies inside an arrangement region of the sealing material 60, and the second λ/4-wavelength layer 22 does not lie between the sealing material 60 and the first substrate 30. The "arrangement region of the sealing material" is a region of the first substrate 30 or the second substrate 50 where the sealing material 60 is to be disposed before the first substrate 30 and the second substrate 50 are bonded together in a step of bonding these substrates. The sealing material 60 may spread out when bonding the substrates. Yet, it is not a problem as long as the second λ/4-wavelength layer does not lie between the sealing material 60 and the first substrate 30 and the outer edge of the second λ/4-wavelength layer 22 lies inside the sealing material 60, in a cross-sectional view of the liquid crystal display panel 100A after the sealing material 60 is cured. In a plan view, a portion of the sealing material 60 may overlap the outer edge of the second λ/4-wavelength layer 22. Since the outer edge of the second λ/4-wavelength layer 22 is not exposed outside the liquid crystal display panel 100A, impurities such as moisture from outside do not enter through the second λ/4-wavelength layer 22. Thus, a decrease in VHR can be suppressed even in a high-temperature and high-humidity environment. It is also possible to suppress display unevenness attributable to absorption of moisture from outside by the retardation layer itself. The outer edge of the second λ/4-wavelength layer 22 refers to a peripheral portion of the second λ/4-wavelength layer 22 in a plan view.

The second λ/4-wavelength layer 22 is a retardation layer that imparts an in-plane retardation of ¼ wavelength to at least light having a wavelength of 550 nm. The second λ/4-wavelength layer 22 may have an in-plane retardation Re2 of 100 nm or more and 176 nm or less as defined by the following formula (2).

$$Re2 = |nx2 - ny2| \times d2 \qquad (2)$$

nx2: Refractive index of in-plane slow axis of second λ/4-wavelength layer ny2: Refractive index of in-plane fast axis of second λ/4-wavelength layer d2: Thickness of second λ/4-wavelength layer The second λ/4-wavelength layer 22 may be a positive A plate that satisfies a relationship $nx2 > ny2 = nz2$ or a negative A plate that satisfies a relationship $nx2 < ny2 = nz2$, where nx2 is the refractive index of the in-plane slow axis, ny2 is the refractive index of the in-plane fast axis, and nz2 is the principal refractive index in the thickness direction.

Figure 7:
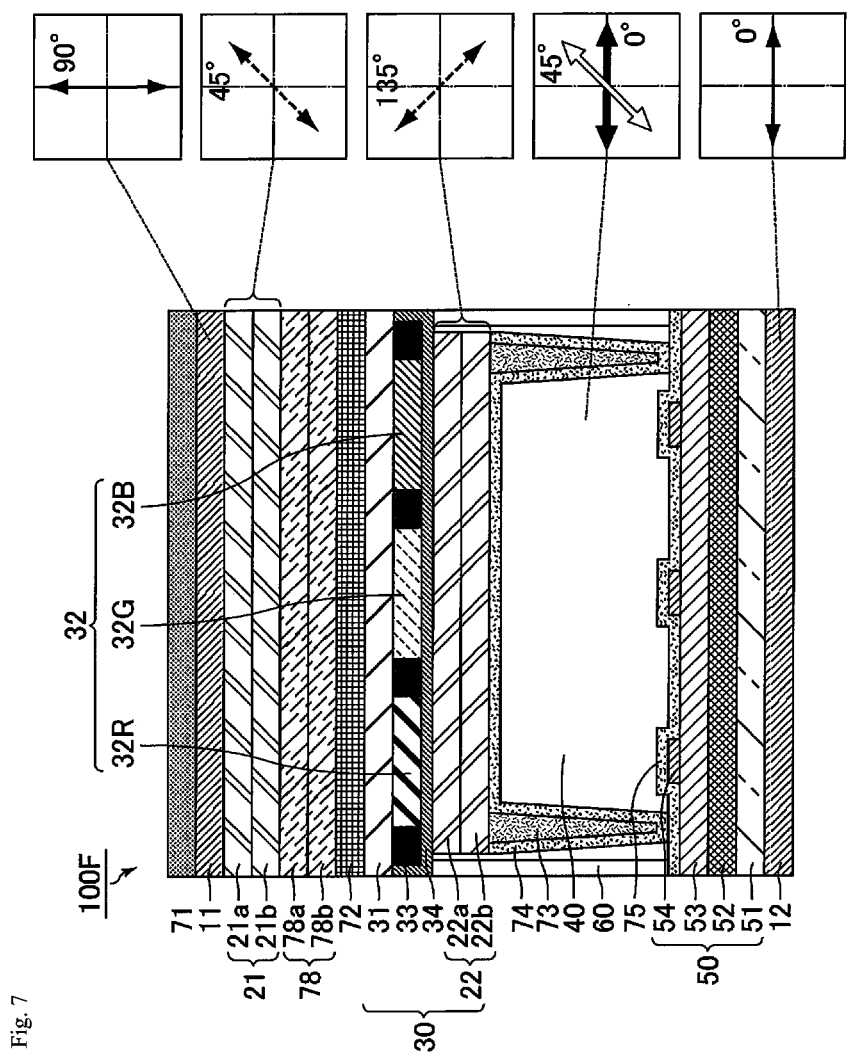
FIG. 7 is a schematic cross-sectional view of a liquid crystal display panel according to Example 6.

The first λ/4-wavelength layer 21 and the second λ/4-wavelength layer 22 may be positive A plates. The positive A plate is suitably used because it is easy to produce and inexpensive. When both the first λ/4-wavelength layer 21 and the second λ/4-wavelength layer 22 are positive A plates, as shown in FIG. 7, the liquid crystal display panel may further include a positive C plate 78 between the first λ/4-wavelength layer 21 and the second λ/4-wavelength layer 22. This makes it possible to cancel out retardation of light incident not only from the normal direction but also from an oblique direction of the liquid crystal display panel 100A, which is caused by the first λ/4-wavelength layer 21 or the second λ/4-wavelength layer 22, thus improving viewing angle characteristics.

The positive C plate 78 satisfies a relationship $nx3 = ny3 < nz3$, where nx3 is the refractive index of the in-plane slow axis, ny3 is the refractive index of the in-plane fast axis, and nz3 is the principal refractive index in the thickness direction. The positive C plate may have a retardation Rth in the thickness direction of 50 nm or more and 150 nm or less, as defined by the following formula (3).

$$Rth = (nz3 - ny3) \times d3 \qquad (3)$$

ny3: In-plane refractive index of positive C plate nz3: Refractive index of positive C plate in the thickness direction d3: Thickness of positive C plate Examples of the positive C plate include a stack of an alignment layer and a liquid crystalline polymer. The alignment layer of the positive C plate may be a stack of an alignment layer having vertical alignment properties and the liquid crystalline polymer (nematic liquid crystal) descried for the first λ/4-wavelength layer 21.

The positive C plate 78 may be stacked on the first λ/4-wavelength layer 21 or the second λ/4-wavelength layer 22. In order to simplify the configuration of the liquid crystal display panel 100A, preferably, the positive C plate 78 is disposed adjacent to the first λ/4-wavelength layer 21. For example, the positive C plate 78 may be disposed between the first λ/4-wavelength layer 21 and a shield electrode 72; between the transparent substrate 31 and the shield electrode 72; or between the first linearly polarizing plate 11 and the first λ/4-wavelength layer 21.

One of the first λ/4-wavelength layer 21 or the second λ/4-wavelength layer 22 may be a positive A plate, and the other may be a negative A plate. Use of the positive A plate and the negative A plate in combination makes it possible to cancel out retardations of light incident not only from the normal direction but also from an oblique direction of the liquid crystal display panel 100A, which were caused by the first λ/4-wavelength layer 21 and the second λ/4-wavelength layer 22, thus improving viewing angle characteristics.

The liquid crystal display panel may further include a viewing angle compensation film. The viewing angle compensation film can suppress light leakage in an oblique direction and improve contrast ratio in an oblique direction during black display. The viewing angle compensation film may be one for horizontal alignment mode, commonly used in the liquid crystal display panel field. Examples include a viewing angle compensation film produced by bonding a shrinkable film to one or both sides of a polymer film to form a stack and heat-stretching the stack. The viewing angle compensation film may be disposed between the first linearly polarizing plate 11 and the transparent substrate 31 or between a transparent substrate 51 and the second linearly polarizing plate 12, for example.

The viewing angle compensation film may be a λ/2 wavelength plate that imparts an in-plane retardation of ½ wavelength to at least light having a wavelength of 550 nm. The viewing angle compensation film may have an in-plane retardation Re4 of 250 nm or more and 290 nm or less as defined by the following formula (4), where nx4 is the refractive index of the in-plane slow axis, ny4 is the refractive index of the in-plane fast axis, and nz4 is the principal refractive index in the thickness direction.

$$Re4=|nx4-ny4|\times d4 \quad (4)$$

nx4: Refractive index of in-plane slow axis of viewing angle compensation film ny4: Refractive index of in-plane fast axis of viewing angle compensation film d4: Thickness of viewing angle compensation film Preferably, the viewing angle compensation film has a value N of 0.4 to 0.6 as defined by the following formula (5).

$$N=(nx4-nz4)/(nx4-ny4) \quad (5)$$

The second λ/4-wavelength layer 22 may be a stack of an alignment layer 22a and a liquid crystalline polymer 22b. The stack of the alignment layer 22a and the liquid crystalline polymer 22b may be the same as the one described for the first λ/4-wavelength layer 21. The stack of the alignment layer 22a and the liquid crystalline polymer 22b is more moisture-absorptive than the alignment films 74 and 75 and a second dielectric layer 76 (described later), or is not sufficiently adhered to the sealing material 60. When the second λ/4-wavelength layer 22 is the stack described above, the present invention can effectively suppress the occurrence of display unevenness.

The in-cell retardation layer can be produced, for example, by the following production method in which a stack sequentially including a substrate such as polyethylene terephthalate (PET), the alignment layer 22a, the liquid crystalline polymer 22b is bonded (transferred) to the color filter 32 and the black matrix 33 or to the first dielectric layer 34 via an adhesive layer (Production Method 1). The second λ/4-wavelength layer 22 is produced first and then bonded to the color filter 32 via an adhesive layer 77. In this manner, dissolution of components of the color filter 32, which may occur during the formation of the second λ/4-wavelength layer 22, can be prevented. In the case of Production Method 1, the first substrate 30 includes the adhesive layer 77 between the second λ/4-wavelength layer 22 and the color filter 32. The adhesive layer 77 is not particularly limited, and any ultraviolet light-curable adhesive can be used. For example, an acrylic or epoxy adhesive can be mentioned. The adhesive layer 77 has a thickness of 1 µm to 5 µm, for example. Alternatively, the in-cell retardation layer can also be produced by a production method in which the alignment layer 22a and the liquid crystalline polymer 22b are directly stacked in the stated order on the color filter 32 and the black matrix 33 or on the first dielectric layer 34 (Production Method 2). The distance between the liquid crystal layer 40 and the color filter 32 can be shortened by directly forming the in-cell retardation layer without the adhesive layer 77. Thus, mixing of colors from an oblique viewing angle can be reduced. Other advantages include a reduction in the thickness of the liquid crystal display panel and a reduction in the number of production steps.

In the case of Production Method 1, the second λ/4-wavelength layer 22 can be patterned by, for example, forming an adhesive layer by pattern printing, transferring the second λ/4-wavelength layer 22 onto the adhesive layer, and removing portions without the adhesive layer. In the case of Production Method 2, the second λ/4-wavelength layer 22 can be patterned by, for example, pattern printing, or by forming a solid λ/4-wavelength layer by printing and then patterning by etching.

Preferably, the second λ/4-wavelength layer 22 has a thickness of 1.0 µm or more and 3.0 µm or less. A more preferred lower limit of the thickness is 1.2 µm, and a more preferred upper limit thereof is 2.0 µm.

The liquid crystal layer 40 contains a liquid crystal composition. The amount of transmitted light is controlled by applying a voltage to the liquid crystal layer 40 and changing the alignment state of the liquid crystal molecules in the liquid crystal composition according to the applied voltage. The alignment azimuth of the liquid crystal molecules in the liquid crystal layer in the no-voltage applied state may be parallel or perpendicular to the transmission axis of the first linearly polarizing plate or the transmission axis of the second linearly polarizing plate. This provides a normally black mode in which the display is black in the no-voltage applied state. The alignment azimuth of the liquid crystal molecules refers to the direction of the liquid crystal molecules when they are projected to the substrate surface, and the tilt angle (polar angle, pre-tilt angle) from the normal direction of the substrate surface is not taken into consideration. For example, when an x-axis and a y-axis perpendicular to the x-axis form an x-y plane parallel to the substrate surface, the alignment azimuth is defined to have a positive value in counterclockwise direction, assuming that the direction of the x-axis is 0°. The no-voltage applied state includes a state in which no voltage is applied to the liquid crystal layer 40 and a state in which a voltage applied to the liquid crystal layer 40 is lower than the threshold value of the liquid crystal molecules.

The liquid crystal molecules may have negative or positive anisotropy of dielectric constant (Δε) defined by the following formula (6). Liquid crystal molecules having positive anisotropy of dielectric constant can be used in view of increasing the response speed. Liquid crystal molecules having negative anisotropy of dielectric constant can be used in view of improving the transmittance because even when a disturbance occurs in application of electric field, such liquid crystal molecules are less susceptible to disturbance in the alignment state and less likely to scatter light.

$$\Delta\varepsilon=\text{(Dielectric constant in direction of major axis)}-\text{(Dielectric constant in direction of minor axis)} \quad (6)$$

The liquid crystal display panel may further include an alignment film 74 between the second λ/4-wavelength layer and the liquid crystal layer 40 to cover at least the second λ/4-wavelength layer 22. An alignment film 75 may also be included between the second substrate 50 and the liquid crystal layer 40. The alignment films 74 and 75 have functions to control the alignment of the liquid crystal molecules in the liquid crystal layer 40. When a voltage applied to the liquid crystal layer 40 is lower than the threshold voltage (including no-voltage application), the alignment of the liquid crystal molecules in the liquid crystal layer 40 is controlled mainly by the functions of the alignment films 74 and 75. Preferably, the alignment films 74 and 75 are respectively disposed on the outermost surfaces of the first substrate 30 and the second substrate 50, on the respective sides facing the liquid crystal layer 40. Since the alignment film 74 covers at least the second λ/4-wavelength layer 22, it is possible to prevent dissolution of impurities from the second λ/4-wavelength layer 22 into the liquid crystal layer 40.

The alignment films 74 and 75 can be formed, for example, by applying an organic alignment material containing polyamic acid, polyimide, acrylic resin, methacrylic resin, maleimide, polysiloxane, or the like, or an inorganic alignment material containing silicate, and drying and baking the organic or inorganic alignment material. Preferably, the alignment film 74 has been subjected to alignment treatment. Non-limiting examples of the alignment treatment method include rubbing and photo-alignment.

The alignment films 74 and 75 may be photo-alignment films. When the alignment films are photo-alignment films, these alignment films preferably contain a polymer having a photoreactive functional group. The "photoreactive functional group" means a functional group that can undergo a structural change when irradiated with light such as ultraviolet light or visible light (electromagnetic wave). Examples of such structural change of the photoreactive functional group include dimerization (dimer formation), isomerization, photo Fries rearrangement, and degradation. The structural change of the photoreactive functional group provides alignment controlling force of the alignment film or causes changes in the level and/or direction of the alignment controlling force of the alignment film. The "alignment controlling force" refers to properties to control the alignment of liquid crystal molecules near the alignment film. Specific examples of the photoreactive functional group include groups such as azobenzene, chalcone, cinnamate, coumarin, tolan, and stilbene groups.

The alignment films 74 and 75 may impart any pre-tilt angle to the liquid crystal molecules. The alignment films 74 and 75 may substantially horizontally align the liquid crystal molecules in the liquid crystal layer 40 (horizontal alignment films) or may substantially vertically align the liquid crystal molecules in the liquid crystal layer 40 (vertical alignment films). When the liquid crystal display panel operates in the transverse electric field mode, the alignment films 74 and 75 are preferably horizontal alignment films.

The liquid crystal display panel may further include a dielectric layer (the second dielectric layer 76) between the second λ/4-wavelength layer 22 and the liquid crystal layer 40 to cover at least the second λ/4-wavelength layer 22. Since the second dielectric layer 76 covers at least the second λ/4-wavelength layer 22, it is possible to prevent dissolution of impurities from the second λ/4-wavelength layer 22 into the liquid crystal layer 40. Since the second dielectric layer 76 disposed between the first substrate 30 and the sealing material 60 does not decrease adhesion therebetween, the second dielectric layer 76 may be disposed on the entire surface of the first substrate 30. When the second dielectric layer 76 is disposed on the entire surface of the first substrate 30, a step of removing a portion overlapping the sealing material 60 can be omitted. In addition, the presence of the second dielectric layer 76 improves adhesion of spacers 73 and reliability of the liquid crystal display panel 100A. The adhesion between the second λ/4-wavelength layer 22 and the spacers 73 may decrease depending on the material of the second λ/4-wavelength layer 22. However, when the second dielectric layer 76 is disposed, the material of the second λ/4-wavelength layer 22 can be selected without considering adhesion to the spacers 73. The second dielectric layer 76 may be the same as the first dielectric layer 34.

The second dielectric layer 76 may be disposed between the second λ/4-wavelength layer 22 and the alignment film 74. The alignment film 74 is formed by applying an alignment material containing polyamic acid or the like, and drying and baking the alignment material, for example. As a solvent of the alignment material, an organic solvent such as a mixed solvent containing γ-butyrolactone, N-methylpyrrolidone (NMP), or butyl cellosolve, for example, may be used in order to adjust viscosity and improve wettability. When an alignment material containing the organic solvent is applied to the second λ/4-wavelength layer 22, the organic solvent may dissolve the second λ/4-wavelength layer 22. Thus, the second λ/4-wavelength layer 22 may not cause desired retardation. The second dielectric layer 76 disposed between the second λ/4-wavelength layer 22 and the alignment film 74 can prevent dissolution of the second λ/4-wavelength layer 22 by the organic solvent contained in the alignment material. Further, the second dielectric layer 76 can also suppress dissolution of components of the second λ/4-wavelength layer 22 and the color filter 32 into the liquid crystal layer 40, making it possible to achieve a high voltage holding ratio.

The liquid crystal display panel may further include the shield electrode 72 on the first substrate 30, on the side opposite to the liquid crystal layer 40. The shield electrode 72 is disposed on the viewer side of the liquid crystal display panel, as a countermeasure to display defects due to static electricity. The shield electrode 72 is preferably disposed at least at a region overlapping a display region where pixel electrodes are formed. A portion of the shield electrode 72 is preferably earthed or electrically connected to a conductive frame, for example. The shield electrode 72 is preferably a transparent electrode. Specific examples include indium tin oxide (ITO) thin films and indium zinc oxide (IZO) thin films. The location of the shield electrode 72 is not particularly limited as long as it is disposed closer to the viewer side than a transparent substrate 31 is. Yet, since the influence of reflection on the surface of the shield electrode 72 is significant, as shown in FIG. 1, the shield electrode 72 is preferably disposed between the transparent substrate 31 and the first λ/4-wavelength layer 21.

The liquid crystal display panel may further include an antireflection film 71 on the first linearly polarizing plate 11, on the side opposite to the first λ/4-wavelength layer 21. The antireflection film 71 can suppress reflection on the surface of the liquid crystal display panel and enhance visibility in bright places. In order to enhance the antireflection effect, preferably, the antireflection film 71 is disposed on the outermost surface on the viewer side of the liquid crystal display panel 100A. Examples of the antireflection film include an antirelfective (AR) film, a low reflection (LR) film, and a film having an irregular structure on its surface in which multiple projections are provided at a pitch corresponding to the wavelength of visible light or shorter. Alternatively, the antireflection film 71 may be formed on a TAC film of the first linearly polarizing plate 11 and integrated with the first linearly polarizing plate 11.

The second substrate 50 may be a thin-film transistor array substrate (TFT substrate), for example. The TFT substrate may be one commonly used in the liquid crystal display panel field. In a plan view, for example, the TFT substrate has a configuration which includes, on the transparent substrate 51, components such as multiple gate signal lines disposed thereon in parallel to each other; multiple source signal lines extending perpendicular to the gate signal lines and disposed in parallel to each other; active elements such as thin-film transistors (TFT) disposed corresponding to intersections between the gate signal lines and the source signal lines; and pixel electrodes 54 disposed in a matrix in a region partitioned by the gate signal lines and the source signal lines. When the liquid crystal display panel 100A operates in the transverse electric field mode, the TFT substrate further includes members such as a common conductive line and a common electrode 52 connected to the common conductive line. The pixel electrodes 54 and the common electrode 52 may be stacked with an insulating layer 53 therebetween.

The spacers 73 may be disposed between the first substrate 30 and the second substrate 50. For example, the spacers 73 are formed on the surface of at least one of the first substrate 30 or the second substrate 50 such that they protrude through the liquid crystal layer 40. Examples of the shape of the spacers 73 include a cylinder, a prism, a truncated cone, and a sphere. Examples of resins to be used for the spacers 73 include photosensitive resins such as acrylic resin. The spacers 73 can be formed by photolithography. The spacers 73 each have a height of 2.0 μm to 4.0 μm, for example.

The liquid crystal display panel may operate in the transverse electric field mode. The transverse electric field mode is a display mode in which the alignment of the liquid crystal molecules is controlled by rotating the liquid crystal molecules mainly in a plane parallel to the substrate surface. Wide viewing angle characteristics can be easily achieved in this mode. In the transverse electric field mode, the liquid crystal molecules are aligned parallel to the first substrate 30 and the second substrate 50 in a plane of the liquid crystal display panel both in the voltage applied state and in the non-voltage applied state of the liquid crystal layer 40. Thus, in the case of a configuration, as in a vertical alignment (VA) mode in which a pair of λ/4-wavelength layers is disposed such that their slow axes are perpendicular to each other with a liquid crystal layer therebetween, the transmittance remains the same in both the voltage applied state and the non-voltage applied state of the liquid crystal layer 40, thus failing to perform monochrome display. In Embodiment 1, the first λ/4-wavelength layer 21 is disposed adjacent to the first substrate 30 which includes the second λ/4-wavelength layer 22, without the liquid crystal layer 40 between these λ/4-wavelength layers. This arrangement makes it possible even for a transverse electric field mode liquid crystal display panel to perform transmissive display while suppressing reflection on the interface between constituent members in the liquid crystal display panel.

Examples of the transverse electric field mode include an in-plane switching (IPS) mode and a fringe field switching (FFS) mode.

In the FFS mode, for example, at least one of the first substrate 30 or the second substrate 50 has a configuration (FFS electrode structure) that includes a planar electrode (the common electrode 52), a slit electrode (the pixel electrodes 54), and an insulating film 53 disposed between the planar electrode and the slit electrode, and an oblique electric field (fringe electric field) is formed in the liquid crystal layer 40. Usually, the slit electrode, the insulating film, and the planar electrode are disposed in the stated order from the liquid crystal layer 40 side. The slit electrode may be, for example, an electrode that includes linear openings as slits each entirely surrounded by an electrode, or a comb-shaped electrode that includes multiple comb teeth in which a liner cut between each comb teeth forms a slit.

In the IPS mode, for example, at least one of the first substrate 30 or the second substrate 50 includes a pair of comb-shaped electrodes (the pixel electrodes 54 and the common electrode 52) and a transverse electric field is formed in the liquid crystal layer 30. The pair of comb-shaped electrodes may be an electrode pair in which each electrode has multiple comb teeth, and these electrodes are disposed such that their come teeth mesh with each other.

In another embodiment, the present invention may provide a liquid crystal display device including the liquid crystal display panel of the present invention and a backlight unit adjacent to the second linearly polarizing plate 12 of the liquid crystal display panel. The backlight unit may be one commonly used in the liquid crystal display device field. The mode of the backlight unit is not particularly limited. Examples include an edge-light backlight unit and a direct-light backlight unit. The type of light sources of the backlight unit is not particularly limited. Examples include light emitting diodes (LEDs) and cold cathode fluorescent lamps (CCFLs).

The liquid crystal display device may further include, in addition to the liquid crystal display panel and the backlight unit, multiple members such as external circuits including a tape carrier package (TCP) and a PCB (printed circuit board); optical films such as a luminance improving film; and a bezel (frame). Some members may be incorporated into other members. Members other than those that have been described are not particularly limited, and those commonly used in the liquid crystal display device field can be used. Thus, descriptions thereof are omitted.

The following describes, with reference to FIG. 1, an example of the relationship among the transmission axes of the first linearly polarizing plate 11 and the second linearly polarizing plate 12, the slow axes of the first λ/4-wavelength layer 21 and the second λ/4-wavelength layer 22, and the alignment azimuth of the liquid crystal molecules in the liquid crystal layer 40.

For example, assuming that the transmission axis of the second linearly polarizing plate 12 is 0°, the transmission axis of the first linearly polarizing plate 11 is 90°. The transmission axis of the first linearly polarizing plate 11 and the slow axis of the first λ/4-wavelength layer 21 are disposed to form an angle of 45° therebetween. This results in a configuration in which a circularly polarizing plate is disposed on the viewer side of the liquid crystal display panel 100A. Thus, the light incident from the viewer side of the liquid crystal display panel 100A is converted into circularly polarized light when the light is transmitted through the first λ/4-wavelength layer 21 of the first linearly polarizing plate 11, thus achieving suppression of reflection from the liquid crystal layer 30.

The first λ/4-wavelength layer 21 and the second λ/4-wavelength layer 22 are disposed such that their slow axes are perpendicular to each other, and are 45° and 135°, respectively. Since the slow axes of the two retardation layers are perpendicular to each other, it is possible to achieve optical properties substantially equivalent to those in the case where the two λ/4-wavelength layers are not disposed. Thus, the light incident from the backlight unit or the like on the backside of the liquid crystal display panel 100A can be emitted as linearly polarized light to the viewer side. In the state where no voltage is applied to the liquid crystal layer 40 (no-voltage applied state), as indicated by a gray double-headed arrow in FIG. 1, the alignment azimuth of the liquid crystal molecules is perpendicular to the transmission axis of the first linearly polarizing plate, thus performing black display. In the state where a voltage is applied to the liquid crystal layer 40 (voltage applied state), as indicated by an outlined double-headed arrow in FIG. 1, the alignment azimuth of the liquid crystal molecules forms an angle of 45° with the first linearly polarizing plate 11 and the transmission axis of the second linearly polarizing plate 12, thus performing white display. In this manner, the liquid crystal display panel can operate in the transverse electric field mode using a circularly polarizing plate.

The present invention is described in more detail below with reference to examples, but the present invention is not limited to these examples.

Example 1

A liquid crystal display panel according to Example 1 is an FFS mode liquid crystal display panel, and has a configuration shown in FIG. 1 and FIG. 2. FIG. 1 is a schematic cross-sectional view of the liquid crystal display panel according to Example 1. FIG. 2 is a schematic plan view of the liquid crystal display panel according to Example 1.

<Preparation of Alignment Material>

Water was added to a commercially available polyvinyl alcohol (Poly(vinyl Alcohol) 1000, Completely Hydrolyzed, available from Wako Pure Chemical Corporation), and the mixture was heated at 100° C. for one hour. Thus, an alignment material (solids content: 2%) was prepared.

<Preparation of Composition Containing Liquid Crystalline Monomer>

The following components were mixed in the specified amounts relative to the total composition: 19.2% by weight of a compound represented by the following chemical formula (2) (available from BASF) as a liquid crystalline monomer, 0.5% by weight of polymerization initiator (Irgacure (registered trademark) 907 available from BASF), 0.1% by weight of a leveling agent (BYK361N available from BYK Japan KK), 1.1% by weight of a reaction additive (Laromer (registered trademark) LR-9000 available from BASF), and 79.1% by weight of propylene glycol 1-monomethyl ether 2-acetate (PGMEA) as a solvent. Thus, a composition containing a liquid crystalline monomer was prepared.

[Chem. 2]

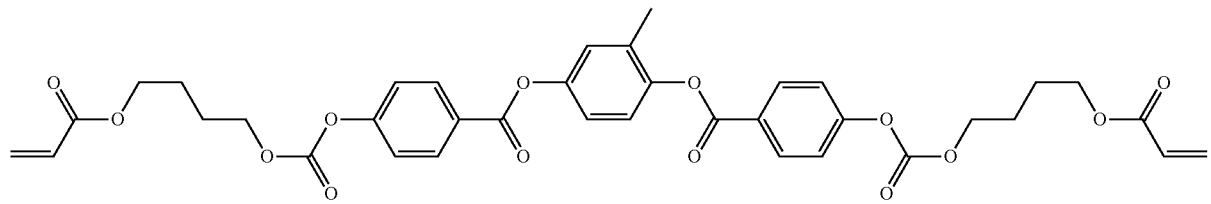

(2)

<Formation of Dielectric Layer>

An indium tin oxide (ITO) thin film was formed on the transparent substrate 31 to produce the shield electrode 72.

<Formation of First λ/4-Wavelength Layer>

The first λ/4-wavelength layer 21 was produced by Production Method 1 described above. First, the alignment material prepared above was applied to a PET film by spin-coating, dried, and baked at 200° C. for 40 minutes. The baked alignment material was then subjected to rubbing, whereby the alignment layer 21a was formed. The composition containing a liquid crystalline monomer prepared above was applied to the alignment layer 21a using a bar coater, and dried at 100° C. for one minute. Then, the dried composition was irradiated with ultraviolet light using a high pressure mercury lamp, whereby the liquid crystalline polymer 21b was formed. Thus, the first λ/4-wavelength layer 21 was formed. The ultraviolet light irradiation was performed with a cumulative dose of 1200 mJ/cm$^2$ at a wavelength of 365 nm in a nitrogen atmosphere. The first λ/4-wavelength layer 21 had a thickness of 1.8 μm as measured with a laser microscope. Then, the first λ/4-wavelength layer 21 was transferred onto the shield electrode 72 via an adhesive layer (PD-S1 having a thickness of 25 μm, available from Panac Co., Ltd.) on the liquid crystalline polymer 21b side, such that the liquid crystalline polymer 21b and the alignment layer 21a were stacked in the stated order on the shield electrode 72. The first λ/4-wavelength layer 21 was transferred such that its slow axis was 45° relative to the longitudinal or transverse direction of the transparent substrate 31.

<Production of CF Substrate>

The color filter 32 including the red the color filter 32R, the green the color filter 32G, and the blue the color filter 32B, and the black matrix 33 were disposed on the transparent substrate 31, on the side opposite to the side on which the shield electrode 72 and the first λ/4-wavelength layer 21 were formed. Then, a dielectric layer (first dielectric layer) 34 formed of a thermosetting resin was formed for flattening. Subsequently, the second λ/4-wavelength layer 22 was formed on the dielectric layer 34 by Production Method 2 described above. The alignment material was applied to the dielectric layer 34, baked as in the first λ/4-wavelength layer 21, and subjected to rubbing, whereby the alignment layer 22a was formed. The composition containing a liquid crystalline monomer was applied to the resultant alignment layer 22a, and the liquid crystalline polymer 22b was formed in the same manner as in the first λ/4-wavelength layer 21, whereby the second λ/4-wavelength layer 22 was formed. A portion overlapping the sealing material 60 was removed by photolithography when forming the second λ4-wavelength layer 22. The second λ/4-wavelength layer 22 was formed such that its slow axis was perpendicular to the slow axis of the first λ/4-wavelength layer 21. Thus, the CF substrate 30 was produced.

<Production of TFT Substrate>

An FFS electrode structure including a stack of the common electrode 52, the insulating film 53, and the pixel electrodes 54, and TFTs were formed on the transparent substrate 51. Thus, the TFT substrate 50 was produced.

<Production of Spacers and Alignment Film>

The photo spacers 73 each having a height of 3.3 μm were formed using a photosensitive resin on the second λ/4-wavelength layer 22 of the CF substrate 30. An alignment material containing polyimide which exhibits horizontal alignment properties was applied by flexography to the surface of the CF substrate 30 on which the second λ/4-wavelength layer 22 and the photo spacers 73 were formed and to the surface of the TFT substrate 50 on which members such as the pixel electrodes 54 were formed so as to form coating films on these surfaces. The alignment material was applied without overlapping the arrangement region of the sealing material 60. The coating films were dried, and then baked at 200° C. for 40 minutes, whereby the alignment films 74 and 75 were produced. The resultant alignment films 74 and 75 were horizontal alignment films, and each had a thickness of 100 nm. Subsequently, the alignment films 74 and 75 were subjected to rubbing.

<Production of Liquid Crystal Layer>

A thermosetting sealant used as the sealing material 60 was applied to the CF substrate 30 using an application device, and the CF substrate 30 was bonded to the TFT substrate 50. Subsequently, the bonded substrates were baked in a 140° C. oven for one hour. Thus, a liquid crystal cell was produced. The liquid crystal composition containing liquid crystal molecules was enclosed in the liquid crystal cell by vacuum injection. The liquid crystal molecules having negative (−4.0) anisotropy of dielectric constant (Δε) and a refractive index (Δn) of 0.095 were used. The liquid crystal layer 40 had a thickness of 3.3 μm. The outer edge of the second λ/4-wavelength layer 22 lied inside the arrangement region of the sealing material 60.

<Bonding of Linearly Polarizing Plate>

The PET film on the first λ/4-wavelength layer 21 was removed. Then, the first linearly polarizing plate 11 and the second linearly polarizing plate 12 (both CVT-1764FCUHC available from Nitto Denko Corporation) were respectively bonded to the surfaces of the CF substrate 30 and the TFT substrate 50, on the respective sides opposite to the liquid crystal layer 40, such that their transmission axes were perpendicular to each other. The transmission axis of the first linearly polarizing plate 11 and the slow axis of the first λ/4-wavelength layer 21 formed an angle of 45° therebetween.

<Bonding of Antireflection Film>

As an antireflection film, ReaLook (registered trademark) X4301 available from NOF Corporation was bonded to the first linearly polarizing plate 11. Thus, the liquid crystal display panel 100A according to Example 1 was completed.

As for the liquid crystal display panel 100A, assuming that the transmission axis of the second linearly polarizing plate 12 was 0°, the slow axis of the second λ/4-wavelength layer was 135°, the slow axis of the first λ/4-wavelength layer 21 was 45°, and the transmission axis of the first linearly polarizing plate 11 was 90°. The first λ/4-wavelength layer 21 was a positive A plate, and had an in-plane retardation of 137.5 nm. The second λ/4-wavelength layer 22 was a positive A plate, and had an in-plane retardation of 137.8 nm. Assuming that the transmission axis of the second linearly polarizing plate 12 was 0°, the alignment azimuth of the liquid crystal molecules in the no-voltage applied state was 0°, and the alignment azimuth of the liquid crystal molecule in the voltage applied state was 45°.

Example 2

Figure 3:
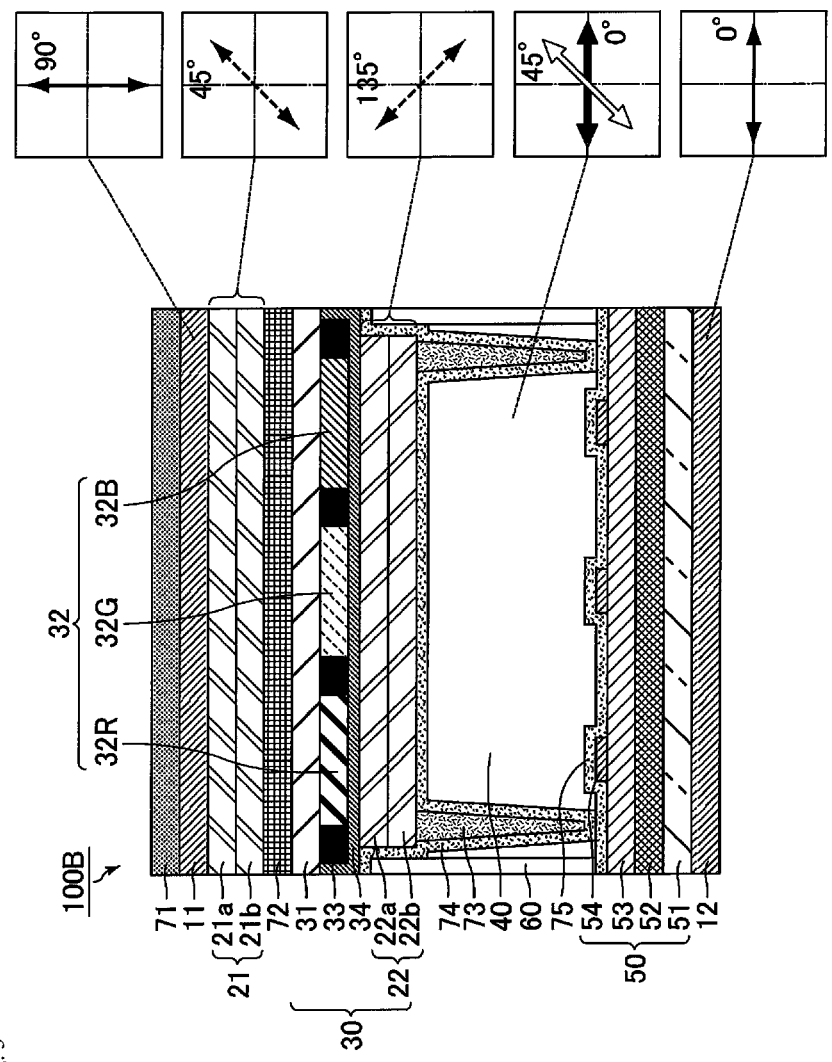
FIG. 3 is a schematic cross-sectional view of a liquid crystal display panel according to Example 2.

FIG. 3 is a schematic cross-sectional view of a liquid crystal display panel according to Example 2. As shown in FIG. 3, a liquid crystal display panel 100B according to Example 2 has the same configuration as in Example 1, except that the alignment film 74 covers the surface of the first substrate 30, on the side facing the liquid crystal layer 40.

In Example 1, the alignment material was applied without overlapping the arrangement region of the sealing material 60. In contrast, in Example 2, the alignment material was applied to the entire surfaces of the first substrate 30 and the second substrate 50 to form coating films. The coating films were dried, and then baked at 200° C. for 40 minutes, whereby the alignment films 74 and 75 were produced. The alignment film 74 had a thickness of 100 nm, as in Example 1. Other than that, the liquid crystal display panel 100B according to Example 2 was produced as in Example 1.

Example 3

Figure 4:
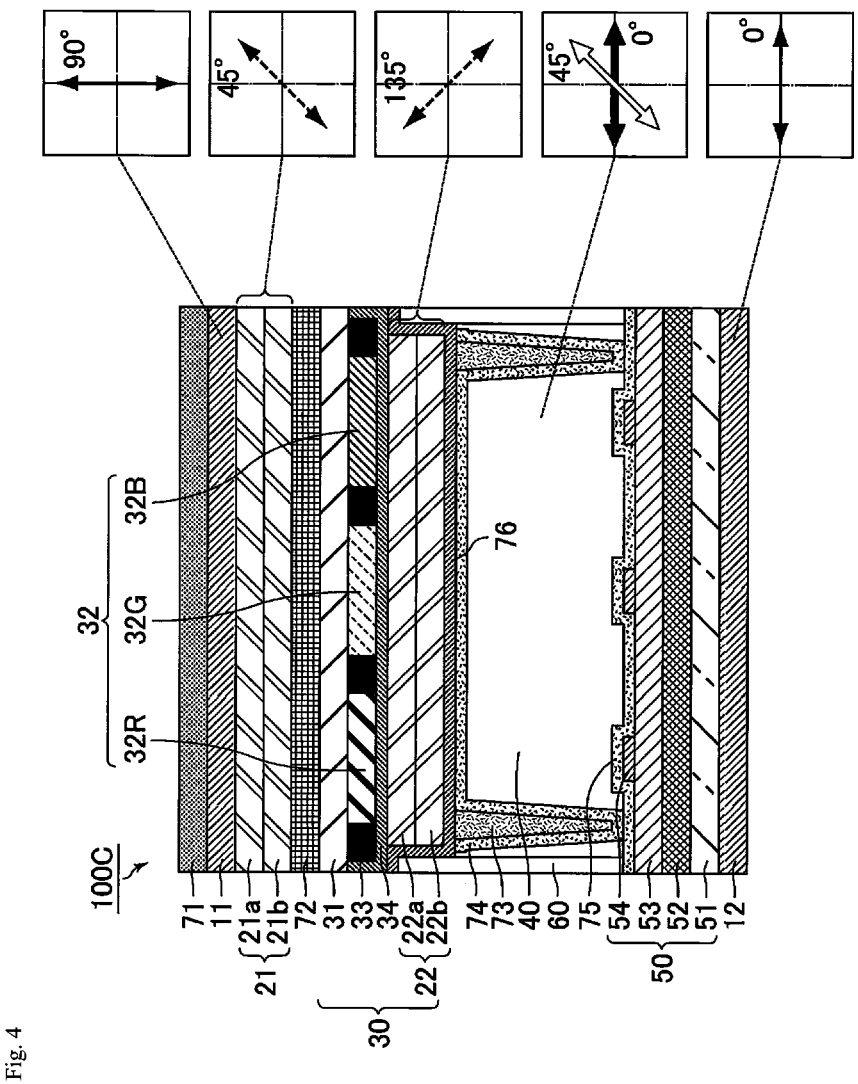
FIG. 4 is a schematic cross-sectional view of a liquid crystal display panel according to Example 3.

FIG. 4 is a schematic cross-sectional view of a liquid crystal display panel according to Example 3. As shown in FIG. 4, a liquid crystal display panel 100C according to Example 3 has the same configuration as in Example 1, except that the second dielectric layer 76 is disposed between the second λ/4-wavelength layer 22 and the liquid crystal layer 40.

In Example 3, first, the second λ/4-wavelength layer 22 was formed as in Example 1. Then, a thermosetting resin was applied to the second λ/4-wavelength layer 22 and dried, whereby the second dielectric layer 76 was formed. Subsequently, photo spacers were formed as in Example 1 on the second dielectric layer 76. Other than that, the liquid crystal display panel 100C according to Example 3 was produced as in Example 1.

Example 4

Figure 5:
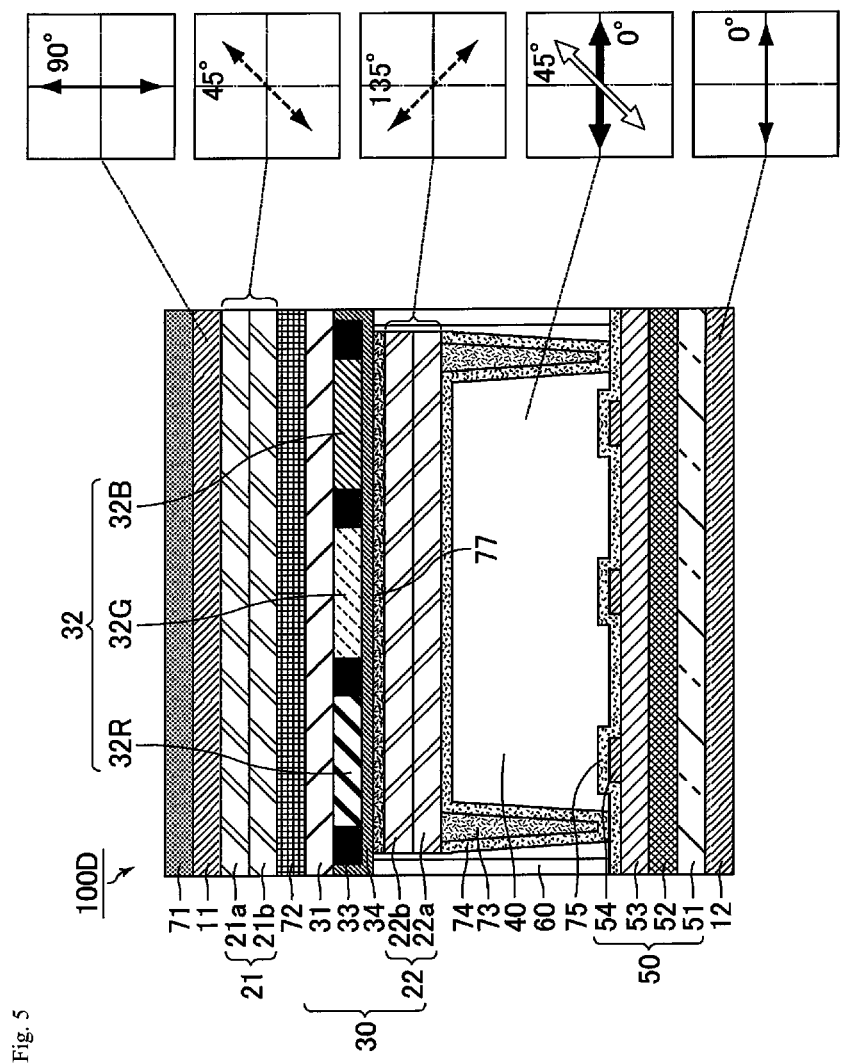
FIG. 5 is a schematic cross-sectional view of a liquid crystal display panel according to Example 4.

FIG. 5 is a schematic cross-sectional view of a liquid crystal display panel according to Example 4. As shown in FIG. 5, a liquid crystal display panel 100D according to Example 4 has the same configuration as in Example 1, except that the adhesive layer 77 is disposed between the second λ/4-wavelength layer 22 and the color filter 32.

In Example 4, the second λ/4-wavelength layer 22 was produced by Production Method 1 described above. As in Example 1, the first dielectric layer 34 was formed on the color filter 32 and the black matrix 33, and a portion of the first dielectric layer 34 which was overlapping the sealing material 60 was removed by photolithography. Next, as in the first λ/4-wavelength layer 21 of Example 1, the alignment layer 22a and the liquid crystalline polymer 22b were formed on a PET film, whereby the second λ/4-wavelength layer 22 was formed. Subsequently, an ultraviolet light-curable adhesive was applied by flexography to a region overlapping the display region on the first dielectric layer 34, followed by bonding between the adhesive and the liquid crystalline polymer 22b of the second λ/4-wavelength layer 22. Here, the bonding was performed such that the slow axis of the second λ/4-wavelength layer 22 was perpendicular to the slow axis of the first λ/4-wavelength layer 21. Then, the adhesive was cured by ultraviolet light irradiation, whereby the adhesive layer 77 was formed. Subsequently, the PET film was removed. Thus, the CF substrate 30 was produced. Other than that, the liquid crystal display panel 100D according to Example 4 was produced as in Example 1. The second λ/4-wavelength layer 22 was a positive A plate, and had an in-plane retardation of 137.8 nm.

Example 5

Figure 6:
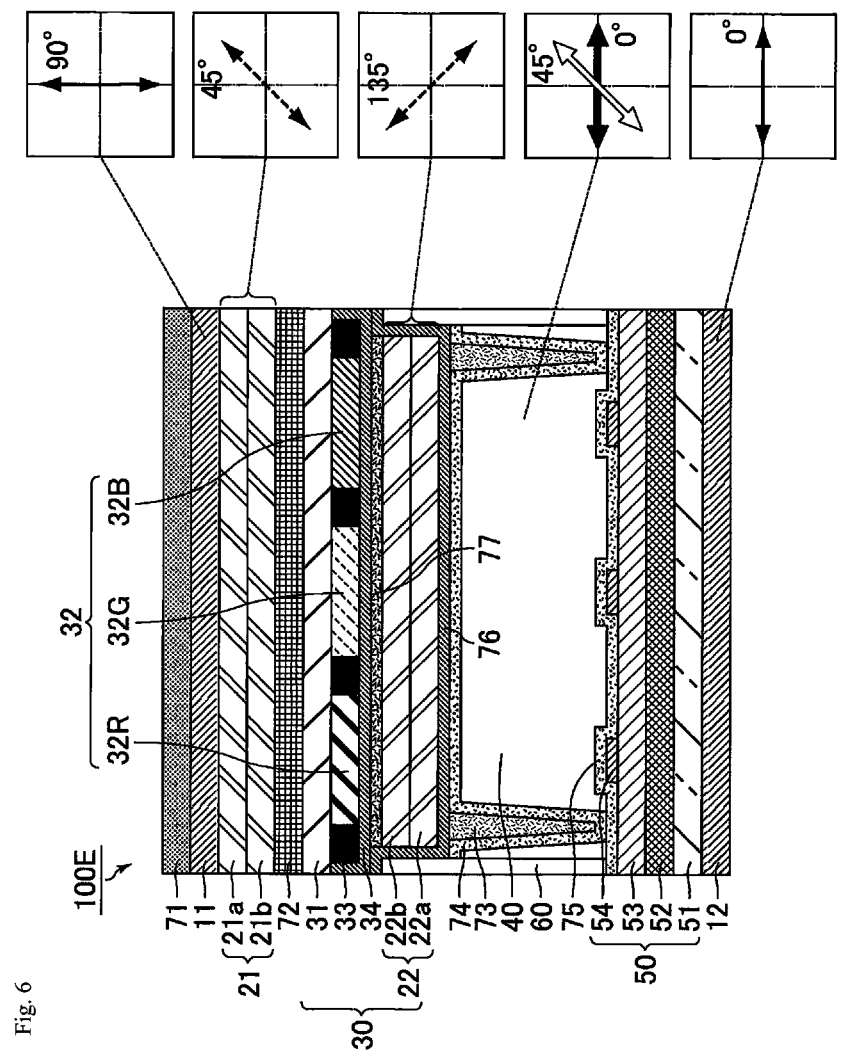
FIG. 6 is a schematic cross-sectional view of a liquid crystal display panel according to Example 5.

FIG. 6 is a schematic cross-sectional view of a liquid crystal display panel according to Example 5. As shown in FIG. 6, a liquid crystal display panel 100E according to Example 5 has the same configuration as in Example 1, except that the adhesive layer 77 is disposed between the second λ/4-wavelength layer 22 and the color filter 32 and that the second dielectric layer 76 is disposed on the second λ/4-wavelength layer 22 of the first substrate 30.

In Example 5, first, the second λ/4-wavelength layer 22 of the first substrate 30 was formed as in Example 4, and then the second dielectric layer 76 formed of a thermosetting resin was formed on the second λ/4-wavelength layer 22. Subsequently, photo spacers were formed as in Example 1 on the second dielectric layer 76. Other than that, the liquid crystal display panel 100E according to Example 5 was produced as in Example 1.

In each of Examples 1 to 5, the first λ/4-wavelength layer and the second λ/4-wavelength layer were both positive A plates. The following describes the production of a liquid crystal display panel further including a positive C plate, and a liquid crystal display panel in which the first λ/4-wavelength layer or the second λ/4-wavelength layer was a negative A plate.

Example 6

FIG. 7 is a schematic cross-sectional view of a liquid crystal display panel according to Example 6. As shown in FIG. 7, a liquid crystal display panel 100F according to Example 6 has the same configuration as in Example 1, except that the positive C plate 78 is disposed between the first λ/4-wavelength layer 21 and the first substrate 30. The positive C plate 78 is a stack of an alignment layer 78a having vertical alignment properties and a liquid crystalline polymer 78b. In FIG. 7, the positive C plate 78 is disposed between the first λ/4-wavelength layer 21 and the shield electrode 72. Yet, the positive C plate 78 may be disposed between the transparent substrate 31 and the shield electrode 72, or between the first linearly polarizing plate 11 and the first λ/4-wavelength layer 21.

<Production of Positive C Plate>

A 75 μm-thick PET film (S-27E available from Toray Industries, Inc.) was coated with an ethyl silicate solution (a mixture solution of ethyl acetate and isopropyl alcohol, 2 wt %, available from Colcoat Co., Ltd.) by a gravure coater, and dried in an air-circulating constant temperature oven at 130° C. for one minute, whereby a 0.1 μm-thick PET film including a glassy polymer film (the alignment layer 78a) was produced. A liquid crystalline composition was prepared by mixing 20% by weight of a liquid crystal compound (Paliocolor LC 242 available from BASF Japan Ltd.) and 1.25% by weight of a polymerization initiator (Irgacure 907 available from BASF Japan Ltd.). The resultant liquid crystalline composition was dissolved in 78.75% by weight of cyclohexanone. Thus, a coating solution was produced. The coating solution was applied to the glassy polymer film (the alignment layer 78a) of the PET film by a rod coater, dried in an air-circulating constant temperature oven at 80° C. for two minutes, and cooled to room temperature (23° C.), whereby a solidified layer of the liquid crystalline composition aligned in homeotropic alignment was formed on the substrate. Then, in an air atmosphere at 30° C., the substrate was irradiated from the coating solution-coated side with 400 mJ/cm² (value measured at a wavelength of 365 nm) of ultraviolet light, using an irradiation device including a metal halide lamp as a light source, whereby the liquid crystalline polymer 78b aligned in homeotropic alignment was formed on the substrate. The liquid crystalline polymer 78b was transferred onto the shield electrode 72 via an adhesive (PD-S1 available from Panac Co., Ltd., 25 μm thick), and the PET film was removed. Thus, the positive C plate 78 was stacked on the shield electrode 72. The resultant positive C plate 78 had a retardation (Rth) in the thickness direction of 95 nm.

Example 7

Figure 8:
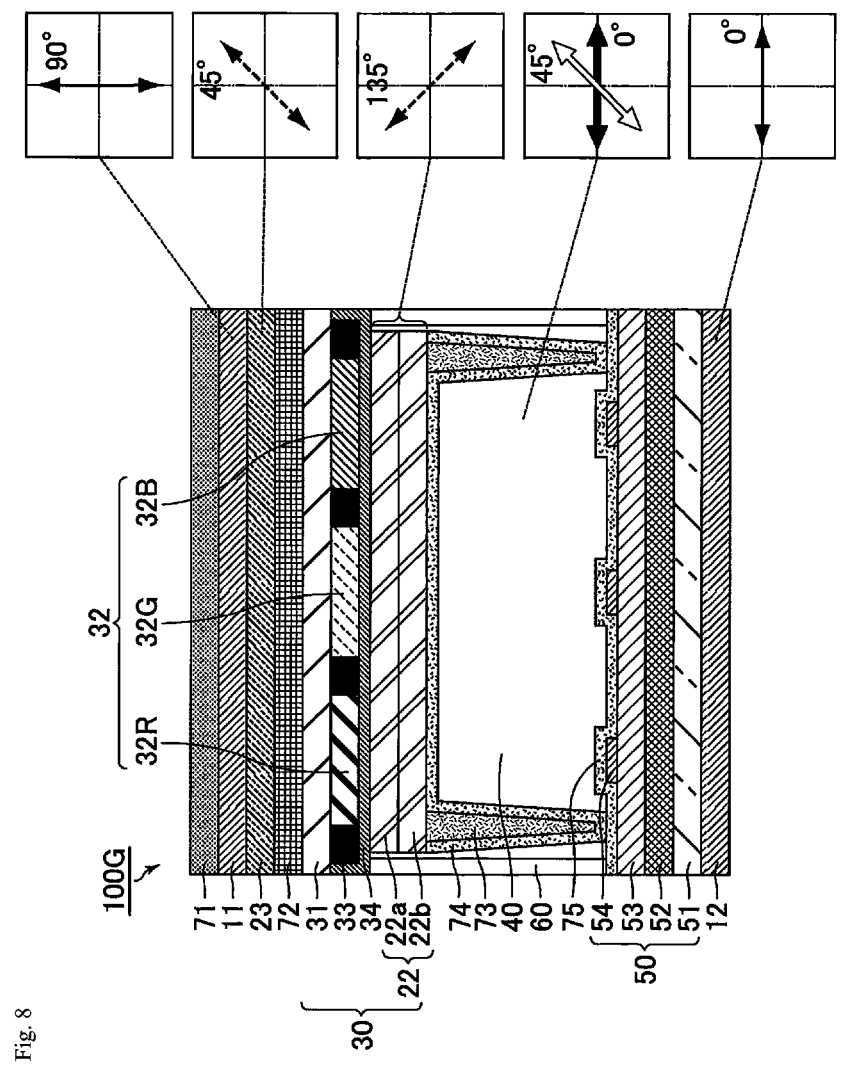
FIG. 8 is a schematic cross-sectional view of a liquid crystal display panel according to Example 7.

FIG. 8 is a schematic cross-sectional view of a liquid crystal display panel according to Example 7. As shown in FIG. 8, a liquid crystal display panel 100G according to Example 7 has the same configuration as in Example 1, except that a first λ/4-wavelength layer 23 is a negative A plate. The first λ/4-wavelength layer 23 is a stretched film containing a birefringent polymer material. It should be noted that a similar effect can be obtained in Example 7 even if the first λ/4-wavelength layer is a positive A plate and the second λ/4-wavelength layer is a negative A plate.

<Production of Negative A Plate>

A reaction vessel was charged with 400 ml of toluene as a polymerization solvent, 0.001 mol of perbutyl neodecanoate as a polymerization initiator, 0.42 mol of N-(2-methylphenyl)maleimide, and 4.05 mol of isobutene for a polymerization reaction at a polymerization temperature of 60° C. for five hours. Thus, a N-(2-methylphenyl)maleimide-isobutene alternating copolymer was obtained. Subsequently, 20% by weight of the resultant N-(2-methylphenyl) maleimide-isobutene alternating copolymer was mixed with 80% by weight of methylene chloride to prepare a solution, and the solution was casted onto a PET film. The methylene chloride was evaporated from the solution, and the solution was solidified, resulting in a N-(2-methylphenyl)maleimide-isobutene alternating copolymer film which was then removed. The removed filter was further dried at 100° C. for four hours, dried at 10° C. intervals from 120° C. to 160° C. for one hour at each temperature interval, and then vacuum dried at 180° C. for four hours in a vacuum drier. Thus, a 100 μm-thick film was obtained. The resultant film was uniaxially stretched 55% using a stretching device at a temperature of 220° C. and a stretching rate of 15 mm/min. Thus, a negative A plate was obtained. The resultant negative A plate had an in-plane retardation (Re) of 137.0 nm. The negative A plate was coated with an adhesive, and stacked as the first λ/4-wavelength layer 23 on the shield electrode 72.

Example 8

Figure 9:
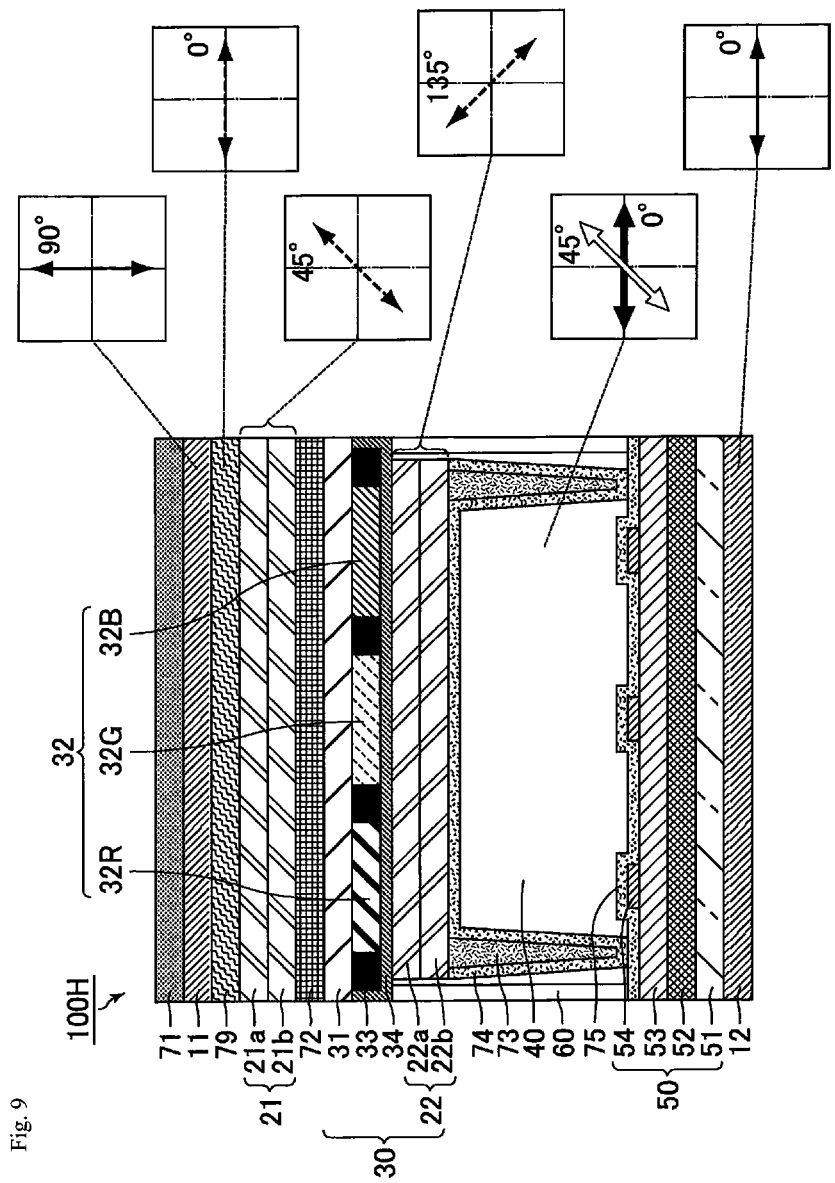
FIG. 9 is a schematic cross-sectional view of a liquid crystal display panel according to Example 8.

FIG. 9 is a schematic cross-sectional view of a liquid crystal display panel according to Example 8. As shown in FIG. 9, a liquid crystal display panel 100H according to Example 8 has the same configuration as in Example 1, except that a viewing angle compensation film 79 is disposed between the first linearly polarizing plate 11 and the first λ/4-wavelength layer 21. The viewing angle compensation film 79 was disposed such that its slow axis was 0°, assuming that the transmission axis of the second linearly polarizing plate 12 was 0°. The viewing angle compensation film 79 had an in-plane retardation of 270 nm, and a value defined by the above formula (5) was 0.5.

Comparative Example 1

Figure 10:
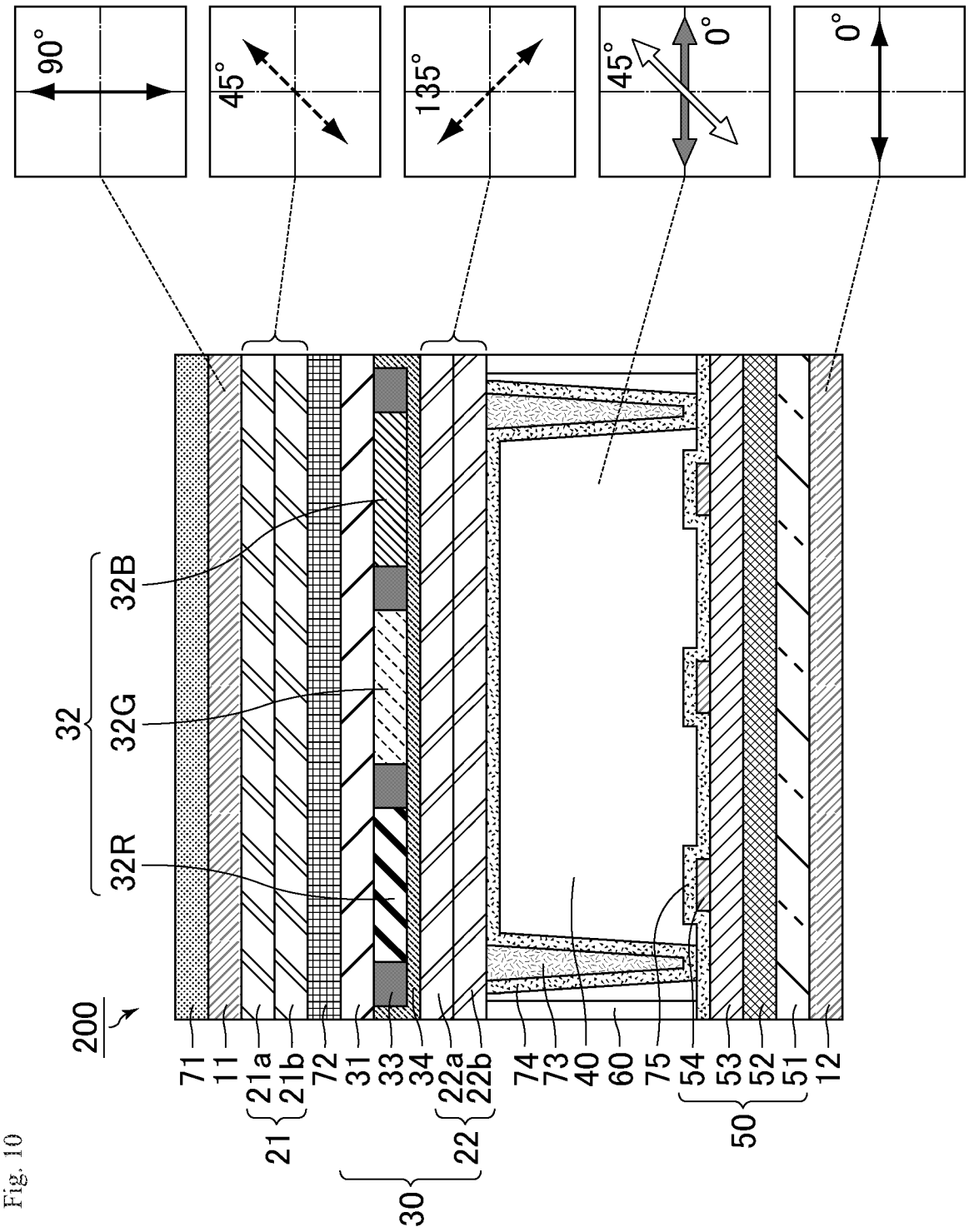
FIG. 10 is a schematic cross-sectional view of a liquid crystal display panel according to Comparative Example 1.

FIG. 10 is a schematic cross-sectional view of a liquid crystal display panel according to Comparative Example 1. As shown in FIG. 10, a liquid crystal display panel 200 according to Comparative Example 1 has the same configuration as in Example 1, except that the outer edge of the second λ/4-wavelength layer 22 overlaps the sealing material 60.

In Example 1, a portion overlapping the sealing material 60 was removed when forming the second λ/4-wavelength layer 22. In contrast, in Comparative Example 1, a portion overlapping the sealing material 60 was not removed, and the sealing material 60 was applied to the second λ/4-wavelength layer 22. Then, the first substrate 30 was bonded to the TFT substrate 50. Other than that, the liquid crystal display panel 200 according to Comparative Example 1 was produced as in Example 1. The liquid crystal display panel of Comparative Example 1 includes the second λ/4-wavelength layer 22 between the first dielectric layer 34 of the first substrate 30 and the sealing material 60, and the outer edge of the second λ/4-wavelength layer 22 is exposed outside the liquid crystal display panel.

Comparative Example 2

Figure 11:
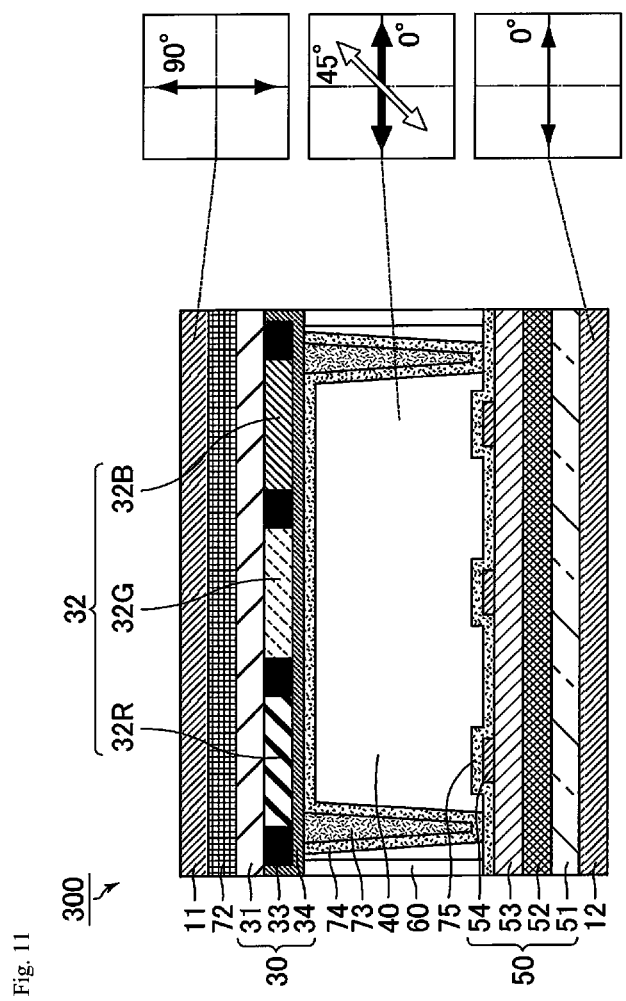
FIG. 11 is a schematic cross-sectional view of a liquid crystal display panel according to Comparative Example 2.

FIG. 11 is a schematic cross-sectional view of a liquid crystal display panel according to Comparative Example 2. As shown in FIG. 11, a liquid crystal display panel 300 according to Comparative Example 2 has the same configuration as in Example 1, except that the first λ/4-wavelength layer 21 and the second λ/4-wavelength layer 22 are not included. In the liquid crystal display panel 300 according to Comparative Example 2, assuming that the transmission axis of the second linearly polarizing plate 12 was 0°, the alignment azimuth of the liquid crystal molecules in the no-voltage applied state was 0°, the alignment azimuth of the liquid crystal molecules in the voltage applied state was 45°, and the transmission axis of the first linearly polarizing plate 11 was 90°.

[Evaluation Test]

Each of the liquid crystal display panels produced in Examples 1 to 7 and Comparative Examples 1 and 2 was provided with a backlight unit on the backside thereof, and performed transmissive display for evaluation of the following properties by the following methods: (1) contrast ratio in a dark place; (2) visibility in a bright place; and (3) display unevenness. Table 1 below shows the results.

(1) Contrast Ratio in Dark Place

Each of the liquid crystal display panels of Examples 1 to 7 and Comparative Examples 1 and 2 performed white display with a grayscale value of 255 and black display with a grayscale value of 0 in a dark place (0 lx) for luminance measurement. The luminance was measured using a spectral-radiance meter "SR-UL1" available from Topcon Corporation. The contrast ratio (CR) was calculated from the obtained values, using the following formula (7).

CR=(Luminance with grayscale value of 255)/(Luminance with grayscale value of 0)  (7)

(2) Visibility in Bright Place

Each of the liquid crystal display panels of Examples 1 to 7 and Comparative Examples 1 and 2 displayed an image at an illuminance of 1000 lx and an illuminance of 20000 lx. Each image was observed by 10 participants, who then evaluated the screen visibility. The visibility was rated A (good) when the number of people who evaluated that the screen was easily viewable was 8 or more; rated B (average) when the number was 4 to 7; and rated F (poor) when the number was 0 to 3.

(3) Display Unevenness

With a checkered flag pattern displayed, each of the liquid crystal display panels of Examples 1 to 7 and Comparative Examples 1 and 2 were left in a test tank set at a high temperature and a high humidity (temperature: 60° C., humidity: 95%) for 1000 hours. Subsequently, each liquid crystal display panel was removed from the test tank, and the pattern was displayed in a full screen with a grayscale value of 32 to evaluate whether or not display unevenness occurred near the borders of the pattern. The display was rated A (good) when the display unevenness did not occur immediately after removal or the display unevenness disappeared within 30 minutes after removal; rated B (average) when the display unevenness persisted for 30 minutes or longer but disappeared within one hour after removal; and rated F (poor) when the display unevenness persisted longer for one hour or longer.

TABLE 1

| | Contrast ratio in dark place (0 lx) | Visibility in bright place (1000 lx) | Visibility in bright place (20,000 lx) | Display unevenness |
|---|---|---|---|---|
| Example 1 | 800 | A | A | A |
| Example 2 | 800 | A | A | A |
| Example 3 | 760 | A | A | A |
| Example 4 | 790 | A | A | A |
| Example 5 | 770 | A | A | A |
| Example 6 | 810 | A | A | A |
| Example 7 | 850 | A | A | A |
| Comparative Example 1 | 810 | A | A | B |
| Comparative Example 2 | 1220 | B | F | A |

As shown in Table 1, all the liquid crystal display panels of Examples 1 to 7 provided excellent visibility in a dark place and a bright place, and hardly caused display unevenness even when used in a high-temperature and high-humidity environment. With regard to visibility in a bright place, the liquid crystal display panels of Examples 1 to 7 and Comparative Example 1 were rated A at an illuminance of 1000 1x and an illuminance of 20000 1x. This rating is attributable to the effect of the circularly polarizing plate obtained by the stack of the first linearly polarizing plate and the second linearly polarizing plate. Because of the effect, the internal reflection in the panel was reduced, and the influence of external light was alleviated, thus improving visibility of the image displayed by transmissive display. In contrast, in the case of the liquid crystal display panel of Comparative Example 2 not including the first λ/4-wavelength layer or the second λ/4-wavelength layer, the image became harder to see as the external light became brighter due to high internal reflection in the panel, and the liquid crystal display panel was rated F at an illuminance of 20000 1×. In regard to display unevenness, the liquid crystal display panels of Examples 1 to 7 and Comparative Example 2 were rated A, but the liquid crystal display panel of Comparative Example 1 was rated B. In this case, presumably, the display unevenness persisted longer because moisture entered from outside the panel due to the presence of the retardation layer under the sealing material.

Further, the liquid crystal display panels of Examples 6 to 8 were evaluated for viewing angle characteristics. For evaluation of viewing angle characteristics, each liquid crystal display panel performed black display in a bright place (1000 lx), and the liquid crystal display panel was observed from an oblique direction to visually determine an increase in black luminance as compared to when the liquid crystal display panel was observed from the normal direction. In Example 6, the first λ/4-wavelength layer 21 was a positive A plate and was stacked with the positive C plate, which resulted in optical properties equivalent to those of a negative A plate. Thus, the viewing angle characteristics were good. In Example 7, the first λ/4-wavelength layer 21 was a negative A plate and the second λ/4-wavelength layer 22 was a positive A plate, which resulted in cancelling of light incident from an oblique direction of the liquid crystal display panel. Thus, the viewing angle characteristics were good. In Example 8, the viewing angle characteristics improved owing to the viewing angle compensation film. As in the liquid crystal display panel 100A according to Example 1, the liquid crystal display panel 100H according to Example 8 provided excellent visibility in a dark place and a bright place, and hardly caused display unevenness even when used in a high-temperature and high-humidity environment.

[Additional Remakes]

One aspect of the present invention may be a liquid crystal display panel including, sequentially from the viewer side: a first linearly polarizing plate; a first λ/4-wavelength layer; a first substrate including a color filter, a black matrix, and a second λ/4-wavelength layer; a liquid crystal layer; a second substrate; and a second linearly polarizing plate, the liquid crystal display panel further including a sealing material disposed so as to surround the liquid crystal layer in a plan view, wherein the second λ/4-wavelength layer is disposed closer to the liquid crystal layer than the color filter and the black matrix are and such that an outer edge of the second λ/4-wavelength layer lies inside an arrangement region of the sealing material, and the first λ/4-wavelength layer and the second λ/4-wavelength layer are disposed such that their slow axes are perpendicular to each other.

The second λ/4-wavelength layer may be a stack of an alignment layer and a liquid crystalline polymer.

The first λ/4-wavelength layer and the second λ/4-wavelength layer may be positive A plates. In this case, the liquid crystal display panel may further include a positive C plate between the first λ/4-wavelength layer and the first substrate.

One of the first λ/4-wavelength layer or the second λ/4-wavelength layer may be a positive A plate, and the other may be a negative A plate.

The liquid crystal display panel may further include an antireflection film on the first linearly polarizing plate, on the side opposite to the first λ/4-wavelength layer.

The liquid crystal display panel may further include a shield electrode on the first substrate, on the side opposite to the liquid crystal layer.

The liquid crystal display panel may operate in a transverse electric field mode.

The alignment azimuth of liquid crystal molecules in the liquid crystal layer in a no-voltage applied state may be parallel or perpendicular to a transmission axis of the first linearly polarizing plate or a transmission axis of the second linearly polarizing plate.

The transmission axis of the first linearly polarizing plate and a slow axis of the first λ/4-wavelength layer may form an angle of 40° to 50° therebetween.

The liquid crystal display panel may further include an alignment film between the second λ/4-wavelength layer and the liquid crystal layer to cover at least the second λ/4-wavelength layer.

The liquid crystal display panel may further include a dielectric layer between the second λ/4-wavelength layer and the liquid crystal layer to cover at least the second λ/4-wavelength layer.

The first substrate may include an adhesive layer between the second λ/4-wavelength layer and the color filter.

Another aspect of the present invention may be a liquid crystal display device including: the liquid crystal display panel of the present invention; and a backlight unit adjacent to the second linearly polarizing plate of the liquid crystal display panel.

REFERENCE SIGNS LIST

11: first linearly polarizing plate
12: second linearly polarizing plate
21, 23: first λ/4-wavelength layer
21a, 22a, 78a: alignment layer
21b, 22b, 78b: liquid crystalline polymer
22: second λ/4-wavelength layer
30: first substrate (CF substrate)
31, 51: transparent substrate
32: color filter
32B: blue color filter
32G: green color filter
32R: red color filter
33: black matrix
34: first dielectric layer
40: liquid crystal layer
50: second substrate (TFT substrate)
60: sealing material
52: common electrode
53: insulating layer
54: pixel electrode
71: antireflection film
72: shield electrode
73: spacer
74, 75: alignment film
76: second dielectric layer
77: adhesive layer
78: positive C plate
79: viewing angle compensation film
100A, 100B, 100C, 100D, 100E, 100F, 100G, 100H, 200, 300: liquid crystal display panel

The invention claimed is:
1. A liquid crystal display panel comprising, sequentially from a viewer side:
   a first linearly polarizing plate;
   a first λ/4-wavelength layer;
   a first substrate including a color filter, a black matrix, and
      a second λ/4-wavelength layer;
   an alignment film; a liquid crystal layer;
   a second substrate; and
   a second linearly polarizing plate, the liquid crystal display panel further comprising a sealing material disposed so as to surround the liquid crystal layer in a plan view, wherein the second λ/4-wavelength layer is a stack of an alignment layer and a liquid crystalline polymer, the second λ/4-wavelength layer is disposed closer to the liquid crystal layer than the color filter and the black matrix are and such that a side surface of the second λ/4-wavelength layer lies inside an arrangement region of the sealing material, the alignment film covers a surface of the second λ/4-wavelength layer on the liquid crystal layer side and the outer edge side surface of the second λ/4-wavelength layer, the sealing material is disposed on the alignment film, and the first λ/4-wavelength layer and the second λ/4-wavelength layer are disposed such that their slow axes are perpendicular to each other.

2. The liquid crystal display panel according to claim 1, wherein the first λ/4-wavelength layer and the second λ/4-wavelength layer are positive A plates.

3. The liquid crystal display panel according to claim 2, further comprising a positive C plate between the first λ/4-wavelength layer and the first substrate.

4. The liquid crystal display panel according to claim 1, wherein one of the first λ/4-wavelength layer or the second λ/4-wavelength layer is a positive A plate and the other is a negative A plate.

5. The liquid crystal display panel according to claim 1, further comprising an antireflection film on the first linearly polarizing plate, on the side opposite to the first λ/4-wavelength layer.

6. The liquid crystal display panel according to claim 1, further comprising a shield electrode on the first substrate, on the side opposite to the liquid crystal layer.

7. The liquid crystal display panel according to claim 1, wherein the liquid crystal display panel operates in a transverse electric field mode.

8. The liquid crystal display panel according to claim 1, wherein an alignment azimuth of liquid crystal molecules in the liquid crystal layer in a no-voltage applied state is parallel or perpendicular to a transmission axis of the first linearly polarizing plate or a transmission axis of the second linearly polarizing plate.

9. The liquid crystal display panel according to claim 1, wherein the transmission axis of the first linearly polarizing plate and a slow axis of the first λ/4-wavelength layer form an angle of 40° to 50° therebetween.

10. A liquid crystal display panel comprising, sequentially from a viewer side:
A first linearly polarizing plate;
a first λ/4-wavelength layer;
a first substrate including a color filter, a black matrix, and a second f/4-wavelength layer;
a dielectric layer; an alignment film; a liquid crystal layer; a second substrate; and a second linearly polarizing plate;
the liquid crystal display panel further comprising a sealing material disposed so as to surround the liquid crystal layer in a plan view,
wherein the second λ/4-wavelength layer is a stack of an alignment layer and a liquid crystalline polymer,
the second λ/4-wavelength layer is disposed closer to the liquid crystal layer than the color filter and the black matrix are and such that a side surface of the second λ/4-wavelength layer lies inside an arrangement region of the sealing material,
the dielectric layer covers a surface of the second λ/4-wavelength layer on the liquid crystal layer side and the side surface of the second λ/4-wavelength layer,
the sealing material is disposed on the dielectric layer, and
the first λ/4-wavelength layer and the second λ/4-wavelength layer are disposed such that their slow axes are perpendicular to each other.

11. The liquid crystal display panel according to claim 1, wherein the first substrate comprises an adhesive layer between the second λ/4-wavelength layer and the color filter.

12. A liquid crystal display device comprising:
the liquid crystal display panel according to claim 1; and
a backlight unit adjacent to the second linearly polarizing plate of the liquid crystal display panel.

13. The liquid crystal display panel according to claim 10, wherein the first λ/4-wavelength layer and the second λ/4-wavelength layer are positive A plates.

14. The liquid crystal display panel according to claim 13, further comprising a positive C plate between the first λ/4-wavelength layer and the first substrate.

15. The liquid crystal display panel according to claim 10, wherein one of the first λ/4-wavelength layer or the second λ/4-wavelength layer is a positive A plate and the other is a negative A plate.

16. The liquid crystal display panel according to claim 10, further comprising an antireflection film on the first linearly polarizing plate, on the side opposite to the first λ/4-wavelength layer.

17. The liquid crystal display panel according to claim 10, further comprising a shield electrode on the first substrate, on the side opposite to the liquid crystal layer.

18. The liquid crystal display panel according to claim 10, wherein the liquid crystal display panel operates in a transverse electric field mode.

19. The liquid crystal display panel according to claim 10, wherein an alignment azimuth of liquid crystal molecules in the liquid crystal layer in a no-voltage applied state is parallel or perpendicular to a transmission axis of the first linearly polarizing plate or a transmission axis of the second linearly polarizing plate.

20. The liquid crystal display panel according to claim 10, wherein the transmission axis of the first linearly polarizing plate and a slow axis of the first λ/4-wavelength layer form an angle of 40° to 50° therebetween.

21. The liquid crystal display panel according to claim 10, wherein the first substrate comprises an adhesive layer between the second λ/4-wavelength layer and the color filter.

22. A liquid crystal display device comprising:
the liquid crystal display panel according to claim 10; and
a backlight unit adjacent to the second linearly polarizing plate of the liquid crystal display panel.

* * * * *